(12) United States Patent
Kim

(10) Patent No.: US 12,414,103 B2
(45) Date of Patent: Sep. 9, 2025

(54) METHOD AND APPARATUS FOR ACTIVATING GAPS FOR A TERMINAL IN WIRELESS MOBILE COMMUNICATION SYSTEM

(71) Applicants: BLACKPIN INC., Seoul (KR); Soenghun Kim, Gyeonggi-do (KR)

(72) Inventor: Soenghun Kim, Gyeonggi-do (KR)

(73) Assignees: Blackpin Inc., Seoul (KR); Soenghun Kim, Gyeonggi-do (KR)

( * ) Notice: Subject to any disclaimer, the term of this patent is extended or adjusted under 35 U.S.C. 154(b) by 94 days.

(21) Appl. No.: 18/135,748

(22) Filed: Apr. 18, 2023

(65) Prior Publication Data

US 2023/0345457 A1 Oct. 26, 2023

(30) Foreign Application Priority Data

Apr. 22, 2022 (KR) .................. 10-2022-0050008

(51) Int. Cl.
*H04W 72/04* (2023.01)
*H04W 72/1263* (2023.01)

(52) U.S. Cl.
CPC ............... *H04W 72/1263* (2013.01)

(58) Field of Classification Search
CPC ......... H04W 72/0446; H04W 72/1263; H04W 72/23
See application file for complete search history.

(56) References Cited

U.S. PATENT DOCUMENTS

| | | | | |
|---|---|---|---|---|
| 2017/0230815 A1* | 8/2017 | Yasukawa | ............. | H04W 72/02 |
| 2023/0106194 A1* | 4/2023 | Rudolf | ............... | H04W 74/006 |
| | | | | 370/329 |
| 2024/0172028 A1* | 5/2024 | Kazmi | ............. | H04W 36/0088 |

FOREIGN PATENT DOCUMENTS

| | | | | | |
|---|---|---|---|---|---|
| CN | 117223352 | * | 3/2022 | ............ | H04W 64/00 |
| KR | 10-2020-0060501 | | 5/2020 | | |
| KR | 10-2020-0060501 A | | 5/2020 | | |
| WO | WO-2022212126 A1 | * | 3/2022 | ........... | G01S 5/0036 |

OTHER PUBLICATIONS

3GPP TS 38.321 v17.0.0, 3$^{rd}$ Generation Partnership Project; Technical Specification Group Radio Access Network; NR; Medium Access Control (MAC) Protocol Specification (Release 17), Mar. 2022, 221 pages.

(Continued)

*Primary Examiner* — Marcus Smith
*Assistant Examiner* — Zhaohui Yang
(74) *Attorney, Agent, or Firm* — Fish & Richardson P.C.

(57) ABSTRACT

A method and apparatus for Method and Apparatus for activating gaps is provided. The method includes receiving a RRCReconfiguration, configuring a one or more gaps based on the one or more gap configuration information, triggering a first message, triggering a Scheduling Request (SR) if a Uplink Shared Channel resource is available and the UL-SCH resource does not accommodate the first message and a MAC subheader, transmitting a first MAC PDU, receiving a second MAC PDU and activating a gap of the one or more gaps based on the second information in the second message.

5 Claims, 10 Drawing Sheets

(56) References Cited

OTHER PUBLICATIONS

3GPP TS38.331 v17.0.0, $3^{Rd}$ Generation Partnership Project; Technical Specification Group Radio Access Network; NR; Radio Resource Control (RRC) Protocol Specification (Release 17), Mar. 2022, 1221 pages.
Korean Notice of Allowance in KR Appln No. 10-2022-0050008, mailed on May 24, 2023, 5 pages (with English Translation).
Korean Office Action in KR Appln No. 10-2022-0050008, mailed on Jan. 18, 2023, 14 pages (with English Translation).
Lin et al. "Chapter 12: A primer on bandwidth parts in 5g new radio," 5G and Beyond, Fundamental and Standards, Springer Nature Switzerland AG, 2021, 14 pages.
3rd Generation Partnership Project;Technical Specification Group Radio Access Network; NR; Medium Access Control (MAC) protocol specification (Release 17), 3GPP TS 38.321 V17.0.0, Apr. 14, 2022.
3rd Generation Partnership Project;Technical Specification Group Radio Access Network; NR; Radio Resource Control (RRC) protocol specification (Release 17), 3GPP TS 38.331 V17.0.0, Apr. 21, 2022.

\* cited by examiner

User Plane Protocol Stack

Control Plane Protocol Stack

Type1Gap, Type2Gap, Type3Gap

Type4Gap

Type5Gap

Type6Gap

Periodic Gap: Type1Gap, Type2Gap, Type3Gap, Type4Gap, periodic Type5Gap, Type6Gap Aperiodic Gap: Aperiodic Type5Gap Aperiodic Gap

METHOD AND APPARATUS FOR ACTIVATING GAPS FOR A TERMINAL IN WIRELESS MOBILE COMMUNICATION SYSTEM

CROSS-REFERENCE TO RELATED APPLICATION

This application claims priority to and the benefit of Korean Patent Application No. 10-2022-0050008, filed on Apr. 22, 2022, the disclosure of which is incorporated herein by reference in its entirety.

BACKGROUND

Technical Field

The present disclosure relates to activating gaps for a terminal in wireless mobile communication system.

Related Art

To meet the increasing demand for wireless data traffic since the commercialization of 4th generation (4G) communication systems, the 5th generation (5G) system is being developed. For the sake of high, 5G system introduced millimeter wave (mmW) frequency bands (e. g. 60 GHz bands). In order to increase the propagation distance by mitigating propagation loss in the 5G communication system, various techniques are introduced such as beamforming, massive multiple—input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

As the uses of terminals diversify, the need to control the operation of terminals by applying various gaps according to circumstances is emerging. For example, it is necessary to set a gap for measurement, a gap for MUSIM operation, or a gap for transmission power control so that the operation of the terminal can proceed efficiently.

SUMMARY

Aspects of the present disclosure are to address the problems of configuring various gaps. Accordingly, an aspect of the present disclosure is to provide a method and an apparatus for configuring gaps for a terminal. In accordance with an aspect of the present disclosure, a method of a terminal in mobile communication system comprises Method and Apparatus for configuring various gaps is provided. The method includes receiving from a base station a SystemInformationBlock1, receiving a RRCReconfiguration, determining a first subframe of a gap based on the first gap information or a first slot of the gap based on the second gap information, the first slot of the gap is first static uplink slot from a first subframe determined based on the tdd-UL-downlink-ConfigurationCommon, number of static uplink slots of a gap is determined based on subcarrier spacing of active uplink bandwidth part.

DETAILED DESCRIPTION

Figure 1A:
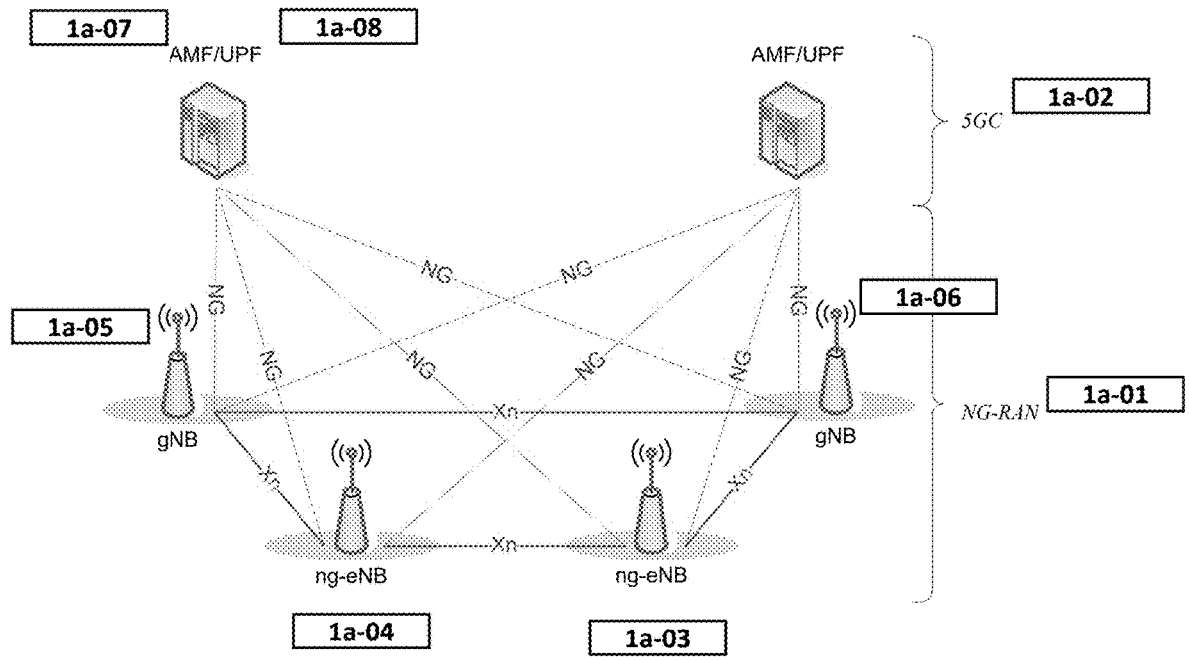
FIG. 1A is a diagram illustrating the architecture of an 5G system and a NG-RAN to which the disclosure may be applied.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name | Acronym | Full name |
|---|---|---|---|
| 5GC | 5G Core Network | RACH | Random Access Channel |
| ACK | Acknowledgement | RAN | Radio Access Network |
| AM | Acknowledged Mode | RAR | Random Access Response |

TABLE 1-continued

| Acronym | Full name | Acronym | Full name |
| --- | --- | --- | --- |
| AMF | Access and Mobility Management Function | RA-RNTI | Random Access RNTI |
| ARQ | Automatic Repeat Request | RAT | Radio Access Technology |
| AS | Access Stratum | RB | Radio Bearer |
| ASN.1 | Abstract Syntax Notation One | RLC | Radio Link Control |
| BSR | Buffer Status Report | RNA | RAN-based Notification Area |
| BWP | Bandwidth Part | RNAU | RAN-based Notification Area Update |
| CA | Carrier Aggregation | RNTI | Radio Network Temporary Identifier |
| CAG | Closed Access Group | RRC | Radio Resource Control |
| CG | Cell Group | RRM | Radio Resource Management |
| C-RNTI | Cell RNTI | RSRP | Reference Signal Received Power |
| CSI | Channel State Information | RSRQ | Reference Signal Received Quality |
| DCI | Downlink Control Information | RSSI | Received Signal Strength Indicator |
| DRB | (user) Data Radio Bearer | SCell | Secondary Cell |
| DRX | Discontinuous Reception | SCS | Subcarrier Spacing |
| HARQ | Hybrid Automatic Repeat Request | SDAP | Service Data Adaptation Protocol |
| IE | Information element | SDU | Service Data Unit |
| LCG | Logical Channel Group | SFN | System Frame Number |
| MAC | Medium Access Control | S-GW | Serving Gateway |
| MIB | Master Information Block | SI | System Information |
| NAS | Non-Access Stratum | SIB | System Information Block |
| NG-RAN | NG Radio Access Network | SpCell | Special Cell |
| NR | NR Radio Access | SRB | Signalling Radio Bearer |
| PBR | Prioritised Bit Rate | SRS | Sounding Reference Signal |
| PCell | Primary Cell | SS | Search Space |
| PCI | Physical Cell Identifier | SSB | SS/PBCH block |
| PDCCH | Physical Downlink Control Channel | SSS | Secondary Synchronisation Signal |
| PDCP | Packet Data Convergence Protocol | SUL | Supplementary Uplink |
| PDSCH | Physical Downlink Shared Channel | TM | Transparent Mode |
| PDU | Protocol Data Unit | UCI | Uplink Control Information |
| PHR | Power Headroom Report | UE | User Equipment |
| PLMN | Public Land Mobile Network | UM | Unacknowledged Mode |
| PRACH | Physical Random Access Channel | CRP | Cell Reselection Priority |
| PRB | Physical Resource Block | | |
| PSS | Primary Synchronisation Signal | | |
| PUCCH | Physical Uplink Control Channel | | |
| PUSCH | Physical Uplink Shared Channel | | |

Table 2 lists the terminologies and their definition used throughout the present disclosure.

TABLE 2

| Terminology | Definition |
| --- | --- |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Cell Reselection Priority | Priority of a carrier frequency regarding cell reselection. System Information Block 2 and System Information Block 3 provide the CRP of the serving frequency and CRPs of inter-frequencies respectively. UE consider higher priority frequency for cell reselection if channel condition of the frequency is better than a |

TABLE 2-continued

| Terminology | Definition |
| --- | --- |
| | specific threshold even if channel condition of a lower priority frequency is better than that of the higher priority frequency. |
| Dedicated signalling | Signalling sent on DCCH logical channel between the network and a single UE. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| NR | NR radio access |
| PCell | SpCell of a master cell group. |
| registered PLMN | PLMN which UE has registered to |
| selected PLMN | PLMN which UE has selected to perform registration procedure |
| equivalent PLMN | PLMN which is equivalent to registered PLMN. UE is informed of list of EPLMNs by AMF during registration procedure |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| DCCH | DCCH is a logical channel to transfer RRC messages after RRC connection establishment |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above. |

TABLE 2-continued

| Terminology | Definition |
|---|---|
| | The cell selection criterion S is fulfilled (i.e. RSRP and RSRQ are better than specific values |

In the present invention, "trigger" or "triggered" and "initiate" or "initiated" may be used in the same meaning.

FIG. 1A is a diagram illustrating the architecture of an 5G system and a NG-RAN to which the disclosure may be applied.

5G system consists of NG-RAN 1A-01 and 5GC 1A-02. An NG-RAN node is either:

a gNB, providing NR user plane and control plane protocol terminations towards the UE; or an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

Functions for Radio Resource Management such as Radio Bearer Control, Radio Admission Control, Connection Mobility Control, Dynamic allocation of resources to UEs in uplink, downlink and sidelink (scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
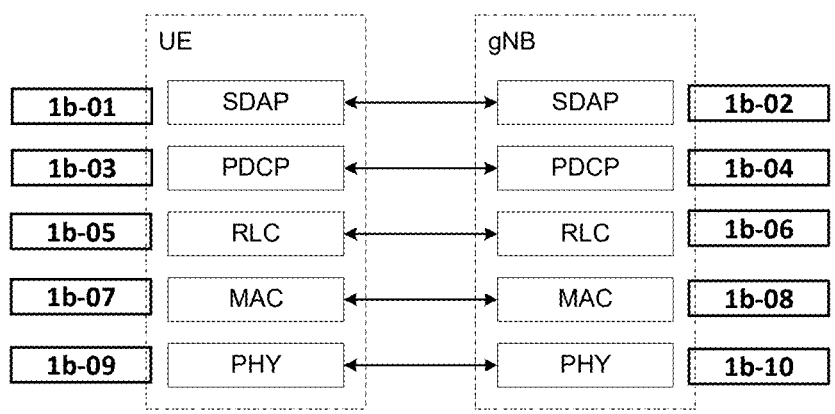
FIG. 1B is a diagram illustrating a wireless protocol architecture in an 5G system to which the disclosure may be applied.
Figure 1B:
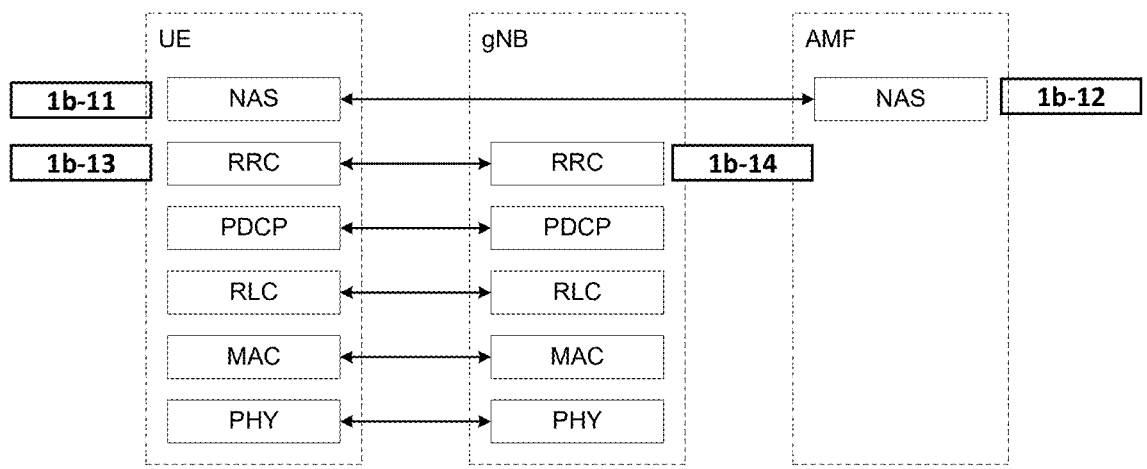

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed in the table 3.

TABLE 3

| Sublayer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

Figure 1C:
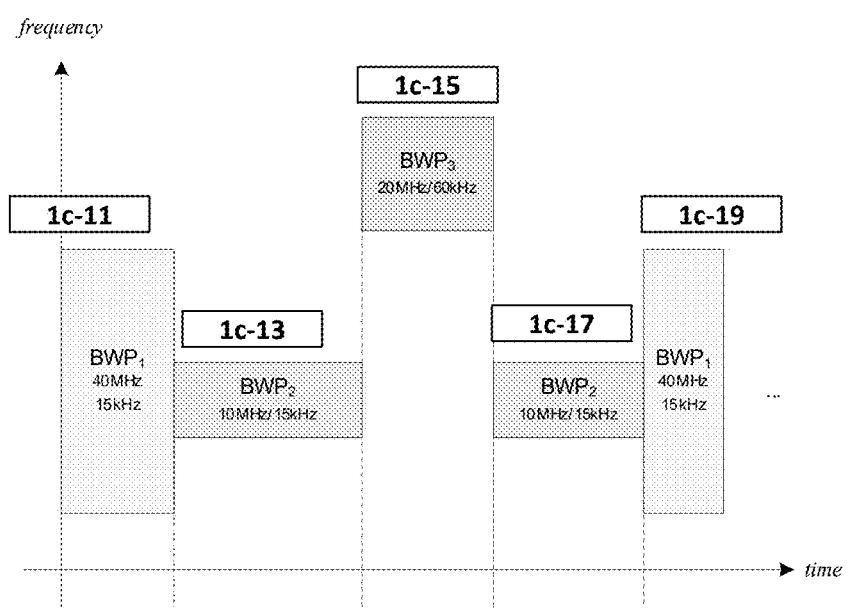
FIG. 1C is a diagram illustrating an example of a bandwidth part.

FIG. 1C is a diagram illustrating an example of a bandwidth part.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

FIG. 1C describes a scenario where 3 different BWPs are configured:
BWP1 with a width of 40 MHz and subcarrier spacing of 15 kHz; 1C-11 or 1C-19
BWP2 with a width of 10 MHz and subcarrier spacing of 15 kHz; 1C-13 or 1C-17
BWP3 with a width of 20 MHz and subcarrier spacing of 60 kHz. 1C-15

Figure 1D:
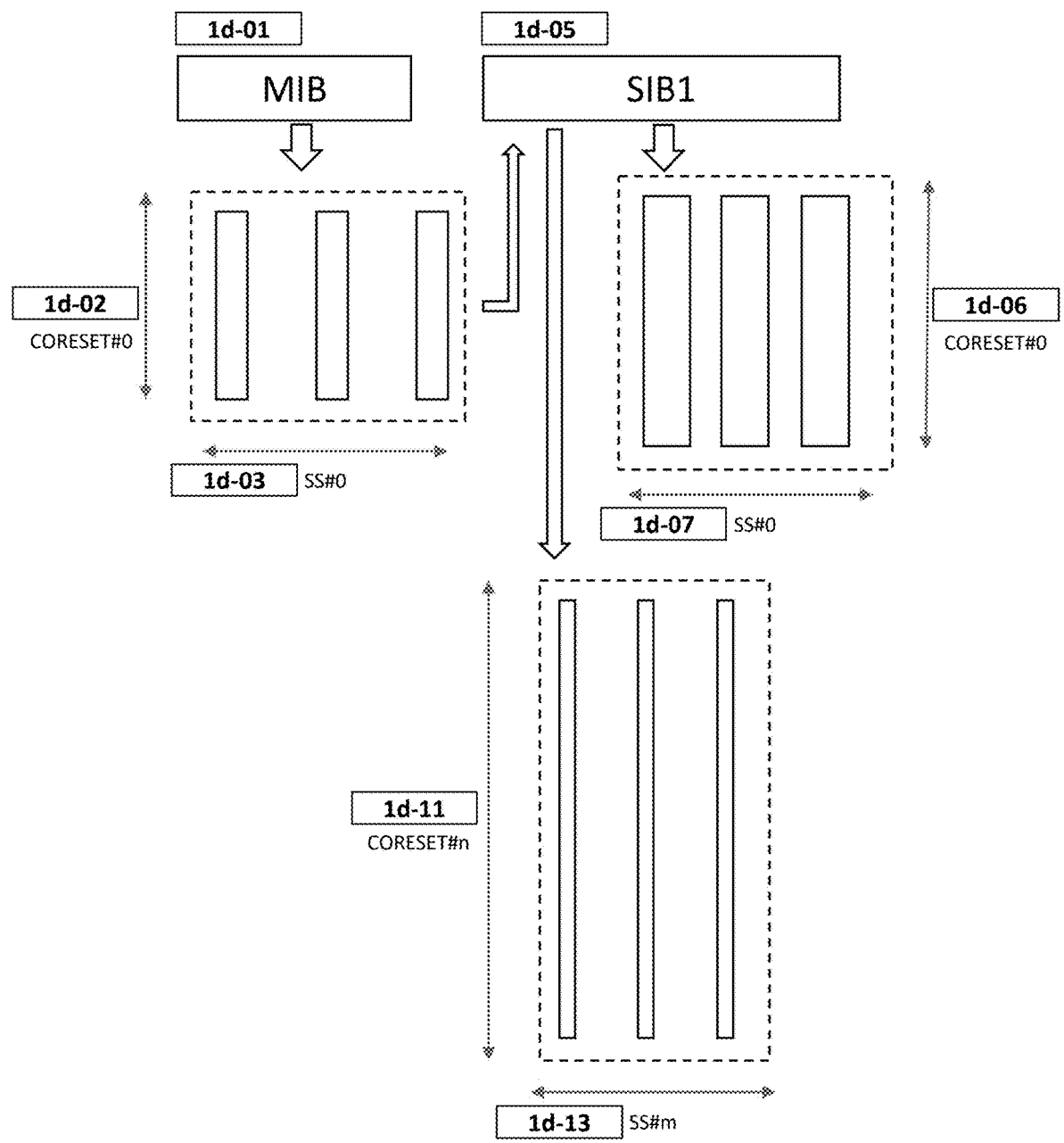
FIG. 1D is a diagram illustrating an example of a search space and a control resource set.

FIG. 1D is a diagram illustrating an example of a search space and a control resource set.

A plurality of SSs may be configured in one BWP. The UE monitors PDCCH candidates according to the SS configuration of the currently activated BWP. One SS consists of an SS identifier, a CORESET identifier indicating the associated CORESET, the period and offset of the slot to be monitored, the slot unit duration, the symbol to be monitored in the slot, the SS type, and the like. The information may be explicitly and individually configured or may be configured by a predetermined index related to predetermined values.

One CORESET consists of a CORESET identifier, frequency domain resource information, symbol unit duration, TCI status information, and the like.

Basically, it can be understood that CORESET provides frequency domain information to be monitored by the UE, and SS provides time domain information to be monitored by the UE.

CORESET #0 and SS #0 may be configured in the IBWP. One CORESET and a plurality of SSs may be additionally configured in the IBWP. Upon receiving the MIB 1D-01, the UE recognizes CORESET #0 1D-02 and SS #0 1D-03 for receiving SIB1 using predetermined information included in the MIB. The UE receives SIB1 1D-05 through CORESET #0 1D-02 and SS #0 1D-03. In SIB1, information constituting CORESET #01D-06 and SS #01D-07 and information constituting another CORESET, for example, CORESET #n1D-11 and SS #m1D-13 may be included.

The terminal receives necessary information from the base station before the terminal enters the RRC_CONNECTED state, such as SIB2 reception, paging reception, and random access response message reception by using the CORESETs and SSs configured in SIB1. CORESET #0 1D-02 configured in MIB and CORESET #0 1D-06 configured in SIB1 may be different from each other, and the former is called a first CORESET #0 and the latter is called a second CORESET #0. SS #0 1D-03 configured in MIB and SS #0 1D-07 configured in SIB1 may be different from each other, and the former is referred to as a first SS #0 and the latter is referred to as a second SS #0. SS #0 and CORESET #0 configured for the RedCap terminal are referred to as a third SS #0 and a third CORESET #0. The first SS #0, the second SS #0, and the third SS #0 may be the same as or different from each other. The first CORESET #0, the second CORESET #0, and the third CORESET #0 may be the same as or different from each other. SS #0 and CORESET #0 are each indicated by a 4-bit index. The 4-bit index indicates a configuration predetermined in the standard specification. Except for SS #0 and CORESET #0, the detailed configuration of the remaining SS and CORSESET is indicated by each individual information element.

When the RRC connection is established, additional BWPs may be configured for the UE.

A Serving Cell may be configured with one or multiple BWPs.

UE can be configured with one or more DL BWPs and one or more UL BWPs in a serving cell. If the serving cell operates in paired spectrum (i.e., FDD band), the number of DL BWPs and the number of UL BWPs can be different. If the serving cell operates in unpaired spectrum (i.e., TDD band), the number of DL BWPs and the number of UL BWPs is same.

SIB1 includes a DownlinkConfigCommonSIB and a UplinkConfigCommonSIB and a tdd-UL-DL-ConfigurationCommon.

Tdd-UL-DL-ConfigurationCommon is cell specific TDD UL/DL configuration. It consists of subfields such as referenceSubcarrierSpacing, pattern1, and pattern2.

ReferenceSubcarrierSpacing is the reference SCS used to determine the time domain boundary in the UL-DL pattern.

Pattern1 and pattern2 are TDD Uplink Downlink Pattern. It consists of subfields such as dl-UL-TransmissionPeriodicity, nrofDownlinkSlots, nrofDownlinkSymbols, nrofUplinkSlots, and nrofUplinkSymbols.

DL-UL-TransmissionPeriodicity indicates the period of the DL-UL pattern.

nrofDownlinkSlots indicates the number of consecutive full DL slots in each DL-UL pattern.

NRofDownlinkSymbols indicates the number of consecutive DL symbols from the beginning of the slot following the last full DL slot.

NRofUplinkSlots indicates the number of consecutive full UL slots in each DL-UL pattern.

NRofUplinkSymbols indicates the number of consecutive UL symbols at the last time point of a slot preceding the first full UL slot.

Slots between the last full DL slot and the first full UL slot are flexible slots. full UL slot is also called static UL slot. UL slot in this disclosure is static UL slot.

DownlinkConfigCommonSIB includes BWP-DownlinkCommon IE for initial DL BWP. UplinkConfigCommonSIB includes BWP-UplinkCommon IE for initial UL BWP. BWP-id of initialDownlinkBWP is 0.

A RRCReconfiguration message includes one or more BWP-Downlink and one or more BWP-Uplink and a firstActiveDownlinkBWP-Id and a bwp-InactivityTimer and a defaultDownlinkBWP-Id and a BWP-DownlinkDedicated for the initial DL BWP.

A BWP-Downlink IE includes a bwp-Id and a BWP-DownlinkCommon and a BWP-DownlinkDedicated.

A BWP-Uplink IE includes a bwp-Id and a BWP-UplinkCommon and a BWP-UplinkDedicated.

The bwp-Id is an integer between 0 and 4. bwp-Id 0 is used only for the BWP indicated in SIB1. bwp-Id1~4 can be used for the BWPs indicated in the RRCReconfiguration message.

BWP-DownlinkCommon IE includes following information: Frequency domain location and bandwidth of this bandwidth part, subcarrier spacing to be used in this BWP, cell specific parameters for the PDCCH of this BWP, cell specific parameters for the PDSCH of this BWP.

BWP-UplinkCommon IE includes following information: Frequency domain location and bandwidth of this bandwidth part, subcarrier spacing to be used in this BWP, cell specific parameters for the PUCCH of this BWP, cell specific parameters for the PUSCH of this BWP, Configuration of cell specific random access parameters.

BWP-DownlinkDedicated is used to configure the dedicated (UE specific) parameters of a downlink BWP. It includes cell specific parameters for the PDCCH of this BWP, cell specific parameters for the PDSCH of this BWP It includes Type2GapStatus. Type2GapStatus IE is enumerated with a single value of "deactivated". Alternatively, Type2GapStatus IE is enumerated with a single value of "activated". Alternatively, Type2GapStatus IE is enumerated with two values of "deactivated" and "activated". Alternatively, Type2GapStatus IE includes an DL BWP-Id.

The BWP-UplinkDedicated is used to configure the dedicated (UE specific) parameters of an uplink BWP.

FirstActiveDownlinkBWP-Id contains the ID of the DL BWP to be activated upon performing the RRC (re-)configuration.

DefaultDownlinkBWP-Id is the ID of the downlink bandwidth part to be used upon expiry of the BWP inactivity timer.

Figure 1E:
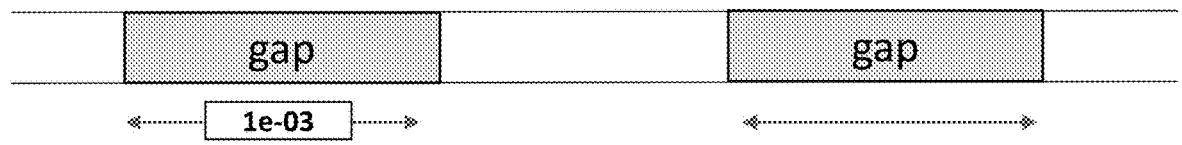
FIG. 1E is a diagram illustrating various gaps.
Figure 1E:
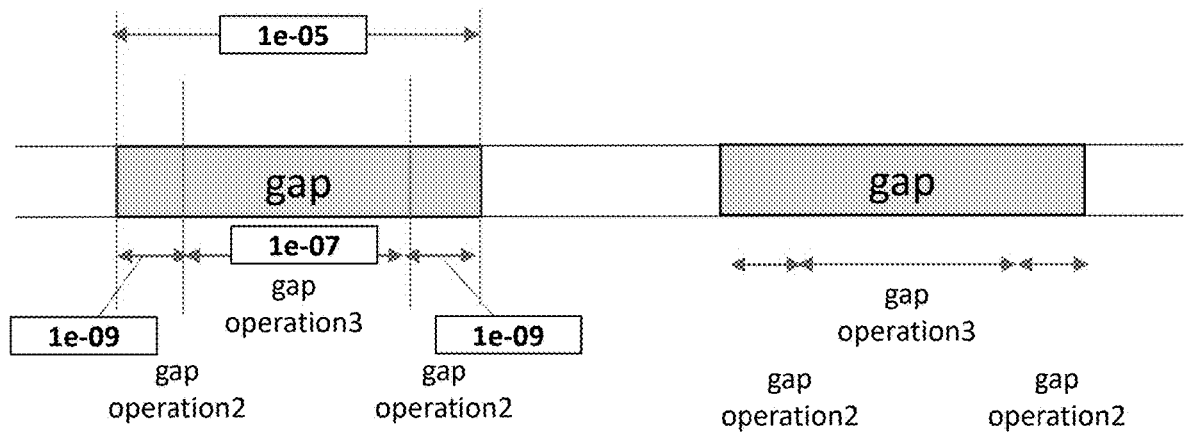
Figure 1E:
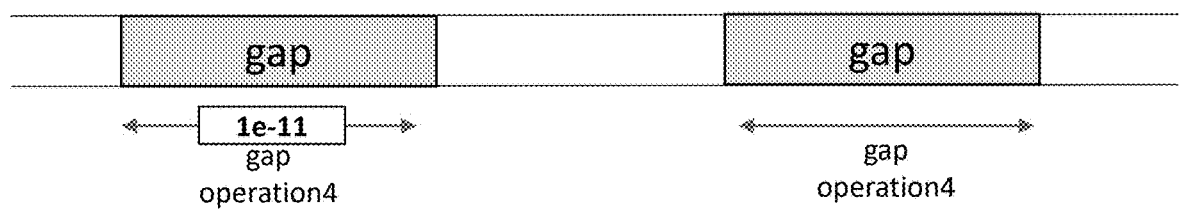
Figure 1E:
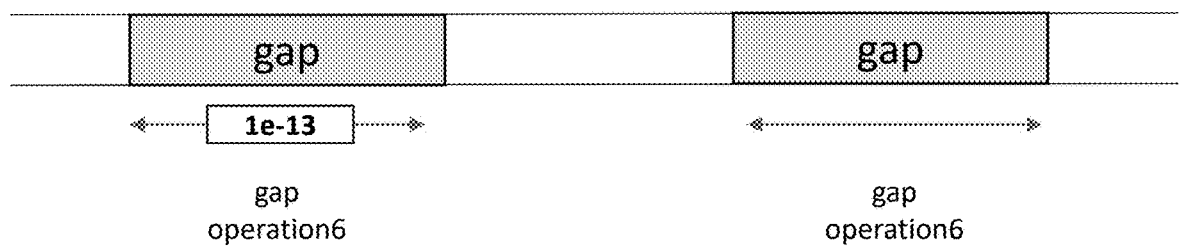

BWP-InactivityTimer is the duration in ms after which the UE falls back to the default Bandwidth Part RRCReconfiguration message includes one or more SCellConfig IEs. A SCellConfig IE is used to configure a secondary cell. A SCellConfig IE can includes a serving cell index and a serving cell configuration and a sCellDeactivationTimer FIG. 1E is a diagram illustrating various gaps.

In this disclosure six gaps are defined: Type1Gap, Type2Gap, Type3Gap, Type4Gap, Type5Gap and Type6Gap.

Type1Gap is used for RRM measurement on all FR1 frequencies or on all FR2 frequencies or on all frequencies. Type1Gap is always activated once it is configured. During a Type1Gap 1E-03, UE performs gap operation1.

Type2Gap is used for RRM measurement on all frequencies. Type2Gap is activated only when an associated BWP is activated (or deactivated). During a Type2Gap 1E-03, UE performs gap operation1-1. A Type2Gap can be called preconfigured gap.

Type3Gap is used for RRM measurement on specific frequency (or frequencies). Type3Gap is always activated once it is configured. During a Type3Gap 1E-03, UE performs gap operation1-1. A Type3Gap can be called concurrent gap. A type3Gap is associated with a frequency if the ID of the type3Gap is indicated in the measurement object of the frequency.

One or more type3Gaps can be associated with a measurement object (i.e. a configuration information for a measurement object can includes a plurality of measGapId(s)). In this case, the plurality of type3Gaps are used simultaneously for measurement on the frequency associated with the measurement object. It is useful in circumstances where adjacent neighboring cells are not synchronized with each other.

Type4Gap is used for RRM measurement on all FR1 frequencies or on all FR2 frequencies or on all frequencies. UE performs data activity like DL-SCH reception during Type4Gap. A Type4Gap 1E-05 consists of two interruption periods 1E-09) and one measurement period 1E-07. During the interruption periods, UE performs gap operation 2. During the measurement period 1E-07, UE performs gap operation 3. A Type4Gap can be called NCSG (Network Controlled Small Gap).

Type5Gap is used for activity in the other USIM. During a Type5Gap 1E-11, UE performs gap operation4. A Type5Gap can be called MUSIM Gap.

Type6Gap is used for power management. During a Type6Gap 1E-13, UE performs gap operation6. Type6Gap starts with an UL slot. UE determines the UL slot based on the tdd-UL-DL-ConfigurationCommon.

Figure 1F:
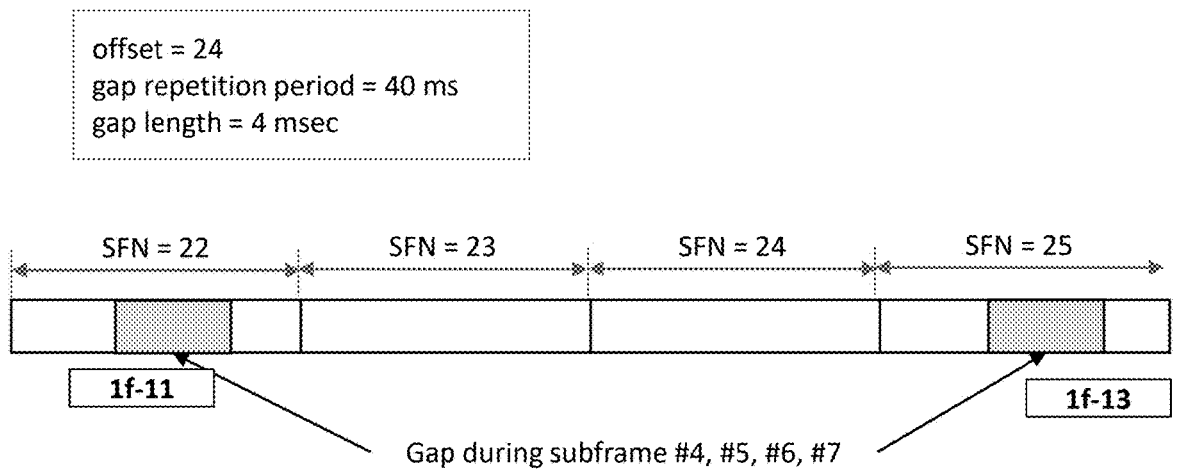
FIG. 1F is a diagram illustrating gap patterns of various gaps.
Figure 1F:
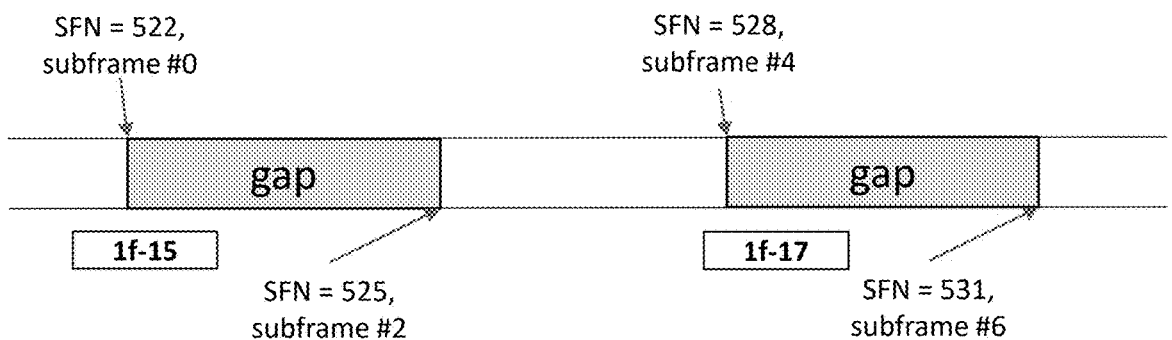

FIG. 1F is a diagram illustrating gap patterns of various gaps.

Type1Gap and Type3Gap and Type4Gap and Type6Gap are periodically occurring once they are configured. Type2Gap is periodically occurring once configured and activated. Type5Gap is either periodically occurring or aperiodically occurring once configured.

The pattern of periodic gaps is controlled by an offset parameter and a gap repetition period parameter and a gap length parameter. For example, when offset is 24 and gap repetition period is 40 ms and gap length is 4 ms, the first gap 1F-11 occurs at subframe #4 of SFN 22 and continues 4 msec. The second gap 1F-13 occurs at subframe #4 of SFN 25 and continues 4 msec and so on.

The pattern of aperiodic gaps is controlled by offset parameter and gap repetition period parameter and gap length parameter and gap number parameter. For example, when offset is 5220 and gap repetition period is 64 ms and gap length is 32 ms, the first gap 1F-15 occurs at subframe #0 of SFN 522 and continues 32 msec. The second gap 1F-17 occurs at subframe #4 of SFN 528 and continues 32 msec. Since gap number is 2, only two gaps occur.

To configure Type1Gap or Type2Gap or Type3Gap or Type4Gap, MeasGapConfig IE is used. MeasGapConfig IE is included in MeasConfig IE. MeasConfig IE is included in RRCReconfiguration message.

MeasGapConfig IE may include a gapFR2 field and a gapFR1 field and a gapUE field and a gapBwpToRemoveList field and a gapBwpToAddModList field and a gapUEToAddModList field and a gapFR2ToAddModList field and a gapFR1ToAddModList field.

GapFR2 field is included in the non-extended part of MeasGapConfig IE. gapFR1 field and gapUE IE are included in the first extended part of MeasGapConfig IE. gapBwpToRemoveList and gapBwpToAddModList and gapFRorUEToRemoveList and gapUEToAddModList and a gapFR2ToAddModList field and a gapFR1ToAddModList field are included in the second extended part of MeasGapConfig IE.

GapFR1 field and gapFR2 field and gapUE field are used to configure Type1Gap or Type4Gap. gapFR1 field and gapFR2 field and gapUE field can include GapConfig IE.

GapOffset and mgl and mgrp and mgta are included in the non-extended part of GapConfig IE.

RefServCellIndicator can be included in the first extended part of GapConfig IE.

refFR2ServCellAsyncCA and mgl2 are included in the second extended part of GapConfig IE.

Type2Indicator and type4Indicator are included in the third extended part of GapConfig IE.

GapUEToRemoveList and gapUEToAddModList and gapFR2ToAddModList and a gapFR1ToAddModList and gapFR2ToRemoveList and gapFR1ToRemoveList are used to configure or release Type2Gap or Type3Gap or Type4Gap.

To configure Type5Gap, Musim-GapConfig IE is used. Musim-GapConfig IE is included in RRCReconfiguration message.

Musim-GapConfig IE can includes musim-GapConfigToRemoveList and musim-GapConfigToAddModList. musim-GapConfigToAddModList consist of plurality of musim-GapConfigToAddMod.

To configure Type6Gap, Type6GapConfig IE is used. Type6GapConfig IE is included in RRCReconfiguration message.

Figure 2:
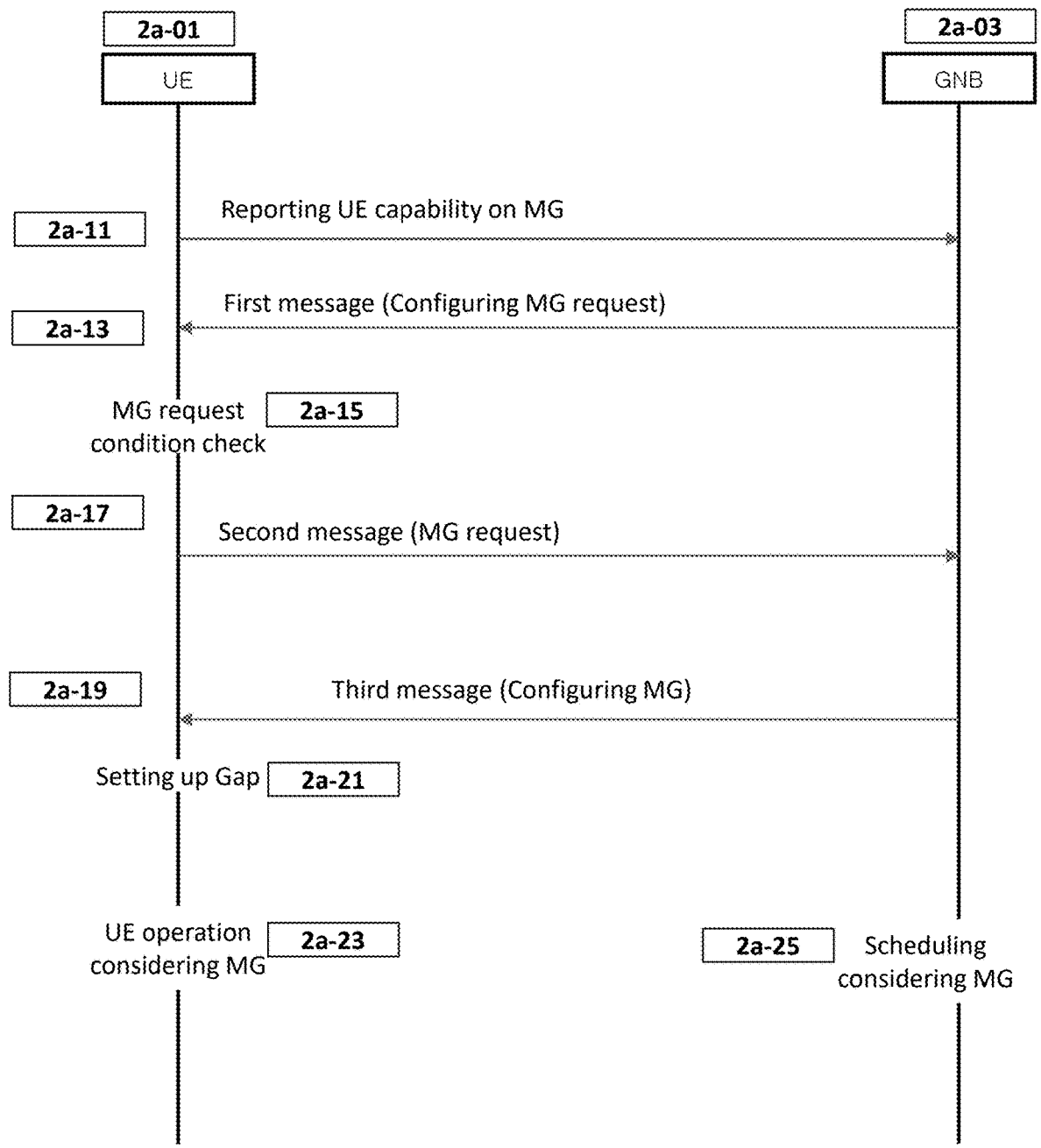
FIG. 2 is a diagram illustrating operations of a terminal and a base station according to an embodiment of the present invention.

FIG. 2 is a diagram illustrating the operations for gap configuration.

In 2A-11, UE transmits GNB UECapabilityInformation message. UECapabilityInformation message includes following gap related capability information: gap-request-capability-information, gap-configuration-capability-information.

gap-request-capability-information includes following information: NeedForGap-Reporting, musim-NeedForGap-Reporting UE can request Type1Gap and Type2Gap and Type3Gap and Type4Gap by transmitting either RRCReconfigurationComplete message or RRCResumeComplete message or LocationMeasurementInfo.

UE can request Type5Gap by transmitting UEAssistanceInformation.

For UE to request gap by transmitting RRCReconfigurationComplete or RRCResumeComplete or UEAssistanceInformation, GNB needs to configure UE to request gap. GNB determines it based on reported capability. UE can request gap by LocationMeasurementInfo without any prior configuration.

NeedForGap-Reporting indicates whether the UE supports reporting the measurement gap requirement information for NR target in the UE response to a network configuration RRC message. It is enumerated with a single value of "support". It is per UE capability. A single IE can be present in UECapability for NR. Absence of the IE indicates the feature is not supported by the UE. Presence of the IE indicates the feature is supported by the UE in FR1 and in FR2 and in FDD and in TDD.

Musim-NeedForGap-Reporting indicates whether the UE supports reporting the gap requirement information for MUSIM. It is enumerated with a single value of "support". It is per UE capability. A single IE can be present in UECapability for NR. Absence of the IE indicates the feature is not supported by the UE. Presence of the IE indicates the feature is supported by the UE in FR1 and in FR2 and in FDD and in TDD.

NeedForGap-Reporting indicates the capability related to type1Gap and type2Gap and type3Gap and type4Gap. If NeedForGap-Reporting and supportType2Gap are reported, UE supports reporting the measurement gap requirement information for Type2Gap. If NeedForGap-Reporting and supportType4Gap are reported, UE supports reporting the measurement gap requirement information for Type4Gap. If NeedForGap-Reporting is reported, UE supports reporting the measurement gap requirements for Type1Gap and Type3Gap.

UE does not report capability on whether the UE support reporting the measurement gap requirement information in the UE initiated RRC message (i.e., LocationMeasurementInfo).

Gap-configuration-capability-information includes following information: supportedGapPattern, supportType2Gap, supportType4Gap, supportType5Gap, supportType6Gap and supportedGapCombination.

SupportedGapPattern indicates measurement gap pattern(s) optionally supported by the UE. It is a bit string with 22 bits. The leading/leftmost bit (bit 0) corresponds to the gap pattern 2, the next bit corresponds to the gap pattern 3 and so on. A gap pattern is defined by a Gap Length and a Repetition Period. It is per UE capability. The supported gap patterns are supported by the UE in FR1 and in FR2 and in FDD and in TDD.

SupportType2Gap indicates whether the UE supports Type2Gap (i.e., gap activated and deactivated depending on which BWP is activated; DL BWP dependent gap). It is per band capability. One or more IEs can be present in UECapability for NR. Absence of the IE in a band information indicates the feature is not supported by the UE in the corresponding band. Presence of the IE indicates the feature is supported by the UE in the corresponding band.

Alternatively, it can be per UE capability. In this case, a single IE can be present in UECapability for NR. Absence of the IE indicates the feature is not supported by the UE. Presence of the IE indicates the feature is supported by the UE in FR1 and in FDD and in TDD. To indicate whether UE support Type2Gap in FR2, additional capability information is used.

SupportType4Gap indicates whether the UE supports Type4Gap (i.e., gap consists of interruption period and measurement period; gap where interruption on data activity occurs in the beginning of a gap and in the end of a gap; gap where measurement is performed without interruption on data activity in the middle of the gap). It is per band capability. One or more IEs can be present in UECapability for NR. Absence of the IE in a band information indicates the feature is not supported by the UE in the corresponding band. Presence of the IE indicates the feature is supported by the UE in the corresponding band.

Alternatively, it can be per UE capability. In this case, a single IE can be present in UECapability for NR. Absence of the IE indicates the feature is not supported by the UE. Presence of the IE indicates the feature is supported by the UE in FR1 and in FR2 and in FDD and in TDD.

SupportType5Gap indicates whether the UE supports Type5Gap. Alternatively, it indicates whether UE supports MUSIM assistance information reporting. It is per UE capability. A single IE can be present in UECapability for NR. Absence of the IE indicates the feature is not supported by the UE. Presence of the IE indicates the feature is supported by the UE in FR1 and in FR2 and in FDD and in TDD.

SupportType6Gap indicates whether the UE supports Type6Gap. It is per FR capability. two IEs can be present in UECapability for NR. Absence of the IE for FR2 indicates the feature is not supported by the UE in the FR2. Presence of the IE for FR2 indicates the feature is supported by the UE in the FR and in TDD. Presence of the IE for FR1 indicates the feature is supported by the UE in the FR and in TDD and in FDD.

SupportedGapCombination indicates gap combinations supported by the UE among predefined gap combinations. It is a bit string with a predefined size. The predefined size is equal to the number of predefined gap combinations optionally supported. The leading/leftmost bit (bit 0) corresponds to the optional gap combination with the lowest index, the next bit corresponds to the optional gap combination with the next lowest index and so on. A gap combination consists of gap combination identifier (or index) and number of per-FR1 gaps and number of per-FR2 gaps and number of per-UE gaps. This IE indicates the number of measurement gaps simultaneously supported by the UE. It is per UE capability. The supported gap combinations are supported by the UE in FR1 and in FR2 and in FDD and in TDD.

A gap combination consists of gap combination identifier (or index) and number of per-FR1 gaps and number of per-FR2 gaps and number of per-UE gaps. Among the predefined gap combinations, some predefined gap combinations are mandatorily supported by the UE. Some predefined gap combinations are optionally supported by the UE. supportedGapCombination indicates which optional gap combinations are supported by the UE.

Example is shown in the table below. The range of the integer is between 0 and 2 (i.e., the highest value is 2 and the lowest value is 0; the maximum number of simultaneous gaps per FR is 2).

TABLE 4

| | # of simultaneous MG | | |
|---|---|---|---|
| Index | Per-FR1 | Per-FR2 | Per-UE |
| ... | ... | ... | ... |
| n | integer1 | integer2 | integer3 |
| n + 1 | integer4 | integer5 | integer6 |
| ... | ... | ... | ... |

Based on reported UE capabilities, GNB determines configurations to be applied to the UE.

BWP-SwitchingDelay defines whether the UE supports DCI and timer based active BWP switching delay type1 or type2. It indicates one of type1 and type2. It is per UE capability. The indicated bwp-SwitchingDelay is supported by the UE in FR1 and in FR2 and in FDD and in TDD.

In 2A-13, GNB transmits UE first RRC message. first RRC message includes configuration information for gap request. Configuration information for gap request includes one of followings: needForGapsConfigNR, needForGapsConfigNR2, needForGapsConfigNR3, musim-AssistanceConfig and needFortype6GapConfig. needForGapsConfigNR and needForGapsConfigNR2 and needForGapsConfigNR3 can be included in RRCReconfiguration message or in RRCResume message. musim-AssistanceConfig and needForType6GapConfig can be included in otherConfig in RRCReconfiguration message.

NeedForGapsConfigNR contains configuration related to the reporting of measurement gap requirement information. needForGapsConfigNR includes a requestedTargetBandFilterNR. The requestedTargetBandFilterNR indicates the target NR bands that the UE is requested to report the gap requirement information. The requestedTargetBandFilterNR consists of one or more frequency band indicators.

NeedForGapsConfigNR2 indicates whether UE is allowed to provide NeedForGapsInfoNR2. This IE is enumerated with a single value "True". If this IE is absent, UE is not allowed to provide NeedForGapsInfoNR2. If this IE is present, UE is allowed to provide NeedForGapsInfoNR2.

NeedForGapsConfigNR3 indicates whether UE is allowed to provide NeedForGapInfoNR3. This IE is enumerated with a single value "True". If this IE is absent, UE is not allowed to provide NeedForGapInfoNR3. If this IE is present, UE is allowed to provide NeedForGapInfoNR3.

If RRCReconfiguration message or RRCResume message includes needForGapInfoNR or if needForGapInfoNR has been setup and has not been released, needForGapsConfigNR2 and needForGapInfoNR3 can be included in the RRCReconfiguration message or in the RRCResume message.

NeedForType6GapConfig indicates whether UE is configured to request for type6gap activation/deactivation and to provide preferred type6Gap pattern. This IE is enumerated with a single value "True". If this IE is absent, UE is not configured to provide preferred type6Gap pattern (or preference on type6Gap). If this IE is present, UE is configured to provide preferred type6Gap pattern (or preference on type6Gap).

Musim-AssistanceConfig includes a gapRequestProhibitTimer field. the gapRequestProhibitTimer is enumerated with values. Each value corresponds to length of duration in a unit of seconds.

In 2A-15, UE checks whether gap-request is needed. UE generates gap request information if so.

UE consider itself to be configured to provide the measurement gap requirement information of NR target bands, if the RRCReconfiguration message includes the needForGapInfoNR and if needForGapInfoNR is set to setup.

UE consider itself to be configured to provide the measurement gap requirement information of NR target bands, if the RRCResume message includes the needForGapInfoNR and if needForGapInfoNR is set to setup.

Condition-group-1 is fulfilled, if the RRCReconfiguration message was received via SRB1 but not within mrdc-SecondaryCellGroup or E-UTRA RRCConnectionReconfiguration or E-UTRA RRCConnectionResume, and if the UE is configured to provide the measurement gap requirement information of NR target bands, and if the RRCReconfiguration message includes the needForGapsConfigNR.

Condition-group-2 is fulfilled if the RRCResume message includes the needForGapsConfigNR.

If condition-group-1 is fulfilled or condition-group-2 is fulfilled, UE include the needForGapsInfoNR in the second RRC message and set the contents as follows:

UE includes intraFreq-needForGap and set the gap requirement information of intra-frequency measurement for each NR serving cell. UE sets either gap or no-gap for each serving cell.

UE includes an entry in interFreq-needForGap and set the gap requirement information for that band if requestedTargetBandFilterNR is configured, for each supported NR band that is also included in requestedTargetBandFilterNR. UE sets either gap or no-gap for each supported NR band.

If condition-group-1 is fulfilled and the RRCReconfiguration message includes needForGapsInfoNR2, or if condition-group-2 is fulfilled and the RRCResume message includes needForGapsInfoNR2, UE includes the needForGapsInfoNR2 in the second RRC message and set the contents as follows:

The second RRC message is RRCReconfigurationComplete if condition-group-1 was fulfilled. The second message is RRCResumeComplete if condition-group-2 was fulfilled.

UE includes intraFreq-needForGap2 and set the interruption requirement information (i.e., whether ncsg is required) of intra-frequency measurement for each NR serving cell. UE sets either ncsg or no-ncsg for each serving cell.

UE includes an entry in interFreq-needForGap2 and set the interruption requirement information for that band if requestedTargetBandFilterNR is configured, for each supported NR band that is also included in requestedTargetBandFilterNR. UE sets either ncsg or no-nscg for each supported NR band.

If condition-group-1 is fulfilled and if the RRCReconfiguration message includes needForGapsInfoNR3 and if only one serving cell is configured to the UE (i.e., UE is not configured with carrier aggregation; UE is configured with single carrier) as consequence of reconfiguration, UE includes the needForGapsInfoNR3 in the second RRC message and set the contents as follows:

UE includes bwpNeedForGap and set the gap requirement information for each DL BWP of PCell (or SpCell).

If condition-group-2 is fulfilled and if the RRCResume message includes needForGapsInfoNR3 and if only one serving cell is configured to the UE (i.e., UE is not configured with carrier aggregation; UE is configured with single carrier) as consequence of RRC connection resumption, UE includes the needForGapsInfoNR3 in the second RRC message and set the contents as follows:

UE includes bwpNeedForGap and set the gap requirement information for each DL BWP of PCell (or SpCell).

UE consider itself to be configured to provide MUSIM assistance information, if the received otherConfig includes musim-AssistanceConfig and if musim-AssistanceConfig is set to setup.

If UE is configured to provide MUSIM assistance information and if UE needs the Type5Gap, UE initiate transmission of UEAssistanceInformation as follows:

If UE has a preference for Type5Gap, UE includes musim-GapRequestList in the UEAssistanceInformation.

If UE determines that type6Gap request is needed, UE generates a type6 request MAC CE. The type6 request MAC CE can includes an information on ratio between the length of type6Gap and the repetition period of type6Gap. If transmission power sum should be decreased a lot, higher ratio is reported.

Alternatively, if UE is configured to provide its preference on type6Gap and if the UE did not transmit a UEAssistanceInformation with type6Gap-Preference since it was configured to provide its preference on type6Gap information, UE initiates transmission of UEAssistanceInformation.

If UE is configured to provide its preference on type6Gap and if the UE transmitted a UEAssistanceInformation with type6Gap-Preference since it was configured to provide its preference on type6Gap and if the current type6Gap preference is different from the one indicated in the last transmission of the UEAssistanceInformation, UE initiates transmission of UEAssistanceInformation.

If UE is configured to provide its preference on type6Gap and if the UE transmitted a UEAssistanceInformation with type6Gap-Preference since it was configured to provide its preference on type6Gap and if type6Gap is not required, UE initiates transmission of UEAssistanceInformation.

If transmission of the UEAssistanceInformation message is initiated to provide preference on type6Gap, UE includes Type6Gap-Preference IE in the UEAssistanceInformation.

If Type6Gap is required, UE includes a Type6Gap-bitmap in the Type6Gap-Preference IE.

If Type6Gap is not required, UE does not include a Type6Gap-bitmap in the Type6Gap-Preference IE.

UE transmits the UEAssistanceInformation to the base station.

NeedForGapsInfoNR consists of intraFreq-needForGap and interFreq-needForGap. NeedForGapsInfoNR is used to indicate the measurement gap requirement information of the UE for NR target bands.

IntraFreq-needForGap field includes NeedForGapsIntraFreqlist IE. This field indicates the measurement gap requirement information for NR intra-frequency measurement.

NeedForGapsIntraFreqlist consists of one or more NeedForGapsIntraFreq. NeedForGapsIntraFreq consists of servCellId and gapIndicationIntra. servCellId indicates the serving cell which contains the target SSB (associated with the initial DL BWP) to be measured. gapIndicationIntra indicates whether measurement gap is required for the UE to perform intra-frequency SSB based measurements on the concerned serving cell. "gap" indicates that a measurement gap is needed if any of the UE configured BWPs do not contain the frequency domain resources of the SSB associated to the initial DL BWP. "no-gap" indicates a measurement gap is not needed to measure the SSB associated to the initial DL BWP for all configured BWPs.

InterFreq-needForGap field includes NeedForGapsBandlistNR. This field indicates the measurement gap requirement information for NR inter-frequency measurement.

NeedForGapsBandlistNR consists of one or more NeedForGapsNR. NeedForGapsNR consists of bandNR and gapIndication. bandNR indicates the NR target band to be measured. gapIndication indicates whether measurement gap is required for the UE to perform SSB based measurements on the concerned NR target band while NR-DC or NE-DC is not configured. The UE determines this information based on the resultant configuration of the RRCReconfiguration or RRCResume message that triggers this response. Value gap indicates that a measurement gap is needed, value no-gap indicates a measurement gap is not needed.

NeedForGapsInfoNR2 consists of intraFreq-needForGap2 and interFreq-needForGap2. NeedForGapsInfoNR2 is used to indicate the interruption requirement information of the UE for NR target bands. Alternatively, this IE is used to indicate type4Gap (i.e., network controlled small gap) requirement information of the UE for NR target bands.

IntraFreq-needForGap2 field includes one or more gapIndication2 IEs. Each of one or more gapIndication2 IE in intraFreq-needForGap2 indicates the interruption requirement (or type4Gap requirement) information for NR intra-frequency measurement with respect to a specific serving cell.

InterFreq-needForGap2 field includes one or more gapIndication2 IEs. Each of one or more gapIndication2 IE in interFreq-needForGap2 indicates the interruption requirement (or type4Gap requirement) information for NR inter-frequency measurement with respect to a specific frequency band.

GapIndication2 is enumerated with three values: "gap" and "ncsg" and "nogap-noncsg".

If gapIndication2 is set to "ncsg" for a serving cell, ncsg (or type4Gap) is required for the UE to perform intra-frequency SSB measurement on the concerned serving cell.

If gapIndication2 is set to "ncsg" for a frequency band, ncsg (or type4Gap) is required for the UE to perform SSB based measurement on the concerned target band.

If gapIndication2 is set to "gap" for a serving cell, type1Gap or type2Gap or type3Gap is required for the UE to perform intra-frequency SSB measurement on the concerned serving cell.

If gapIndication2 is set to "gap" for a frequency band, type1Gap or type2Gap or type3Gap is required for the UE to perform SSB based measurement on the concerned target band.

If gapIndication2 is set to "nogap-noncsg" for a serving cell, neither type1Gap nor type2Gap nor type3Gap nor type4Gap is required for the UE to perform intra-frequency SSB measurement on the concerned serving cell.

If gapIndication2 is set to "nogap-noncsg" for a frequency band, neither type1Gap nor type2Gap nor type3Gap nor type4Gap is required for the UE to perform SSB based measurement on the concerned target band.

NeedForGapsInfoNR3 consists of a bwpNeedForGap. NeedForGapsInfoNR3 is used to indicate the measurement gap requirement information of DL BWPs configured for the UE.

BWPNeedForGap field includes a BIT STRING. The size of the BIT STRING is equal to the number of DL BWPs configured for the UE in the PCell. Alternatively, the size of the BIT STRING is fixed to a specific value such as 4.

The leading/leftmost bit (bit 0) corresponds to the DL BWP with lowest index (or BWP 0). The next bit corresponds to the DL BWP with next lowest index (or BWP 1) and so on. Value 1 indicates type2Gap is required for the UE to perform measurement in the corresponding DL BWP. Value 0 indicates type2Gap is not required for the UE to perform measurement in the corresponding DL BWP. The measurement can be intra-frequency measurement based on SSB or intra-frequency measurement based on CSI-RS.

MUSIM-GapRequestList consists of MUSIM-GapRequestList IE. This IE indicate the MUSIM gap (i.e., type5Gap) requirement information.

MUSIM-GapRequestList IE includes one or two or three MUSIM-GapRequestInfo IE. The reason to limit to three in maximum is because configuring a single aperiodic gap and two periodic gaps is a common scenario with consideration of MUSIM gap usage.

MUSIM-GapRequestInfo includes RequestedMusim-GapType and RequestedMusim-GapOffset and RequestedMusim-GapLength and RequestedMusim-GapRepetitionPeriod and RequestedMusim-GapNumber.

RequestedMusim-GapType is enumerated with a single value of "aperiodic". If this IE is present in MUSIM-GapRequestInfo and this IE indicates "aperiodic", aperiodic musim-gap is required. If this IE is absent in MUSIM-GapRequestInfo, periodic musim-gap is required.

Alternatively, RequestedMusim-GapType is enumerated with a single value of "periodic". If this IE is present in MUSIM-GapRequestInfo and this IE indicates "periodic", periodic musim-gap is required. If this IE is absent in MUSIM-GapRequestInfo, aperiodic musim-gap is required.

Alternatively, if RequestedMusim-GapRepetitionPeriod is present in MUSIM-GapRequestInfo, periodic musim-gap is required. If this IE is absent in MUSIM-GapRequestInfo, aperiodic musim-gap is required.

Alternatively, if RequestedMusim-GapRepetitionPeriod in MUSIM-GapRequestInfo is set to a specific value like 0, aperiodic musim-gap is required. If RequestedMusim-GapRepetitionPeriod in MUSIM-GapRequestInfo is set to other value, periodic musim-gap is required.

Alternatively, if RequestedMusim-GapNumber is present in MUSIM-GapRequestInfo, aperiodic musim-gap is required. If this IE is absent in MUSIM-GapRequestInfo, periodic musim-gap is required.

RequestedMusim-GapOffset1 and RequestedMusim-GapOffset2 indicate the preferred musim-Gap starting time point.

RequestedMusim GapLength1 and RequestedMusim-GapLength2 indicate the preferred musim-Gap length.

RequestedMusim-GapRepetitionPeriod1 and RequestedMusim-GapRepetitionPeriod2 indicate the preferred repetition period.

RequestedMusim-GapNumber indicates the preferred number of aperiodic musim-Gap.

If the requested gap is periodic gap, RequestedMusim-GapOffset1 and RequestedMusim-GapLength1 and RequestedMusim-GapRepetitionPeriod1 are included.

If the requested gap is aperiodic gap, RequestedMusim-GapOffset2 and RequestedMusim-GapLength2 and RequestedMusim-GapRepetitionPeriod2 and RequestedMusim-GapNumber are included.

RequestedMusim-GapOffset1 is an integer between 0 and 159. RequestedMusim-GapOffset2 is an integer between 0 and 10239.

RequestedMusim-GapLength1 is enumerated with eight values: ms1dot5, ms3, ms3dot5, ms4, ms5dot5, ms6, ms10, ms20.

RequestedMusim-GapLength2 is enumerated with four values: ms32, ms64, ms128, ms256.

RequestedMusim-GapRepetitionPeriod1 is enumerated with four values: ms20, ms40, ms80, ms160.

RequestedMusim-GapRepetitionPeriod2 is enumerated with four values: ms64, ms128, ms256, ms512.

RequestedMusim-GapRepetitionPeriod1 is enumerated with four values: one, two, four, eight.

Type6Gap-Preference IE may include Type6Gap-bitmap IE or may include no sub-level IE.

The Type6Gap-bitmap is 4 bit. Each bit corresponds to a specific Type6Gap pattern. The first bit corresponds to a first Type6Gap pattern, the second bit corresponds to a second Type6Gap pattern and so on. Each of the first Type6Gap pattern and the second Type6Gap pattern and the third Type6Gap pattern is associated with a specific gap length and a specific gap repetition periodicity respectively.

The fourth Type6Gap pattern is associated with two gap lengths. The first gap length is applicable when the SCS of the active UL BWP of a first cell is 15 KHz or 30 KHz and the second gap length is applicable when the SCS of the active UL BWP of a first cell is 60 KHz or 120. The first cell is the SpCell of the UE. The first cell could be the serving cell with the shortest SCS among the configured serving cells in FR2. The first cell could be the serving cell with the longest SCS among the configured serving cells in FR2.

UE determines which type6Gap is required based on uplink transmission power situation and sets the corresponding bit accordingly.

In 2A-17, UE transmits GNB second RRC message.

If the first RRC message was RRCResume message, the second RRC message is RRCResumeComplete message. The RRCResumeComplete message can include either NeedForGapsInfoNR or NeedForGapsInfoNR and NeedForGapsInfoNR2 or NeedForGapsInfoNR and NeedForGapsInfoNR3.

If the first RRC message was RRCReconfiguration message, and if UE consider itself to be configured to provide the measurement gap requirement information, the second RRC message is RRCReconfigurationComplete message. The RRCReconfigurationComplete message can include either NeedForGapsInfoNR or NeedForGapsInfoNR and NeedForGapsInfoNR2 or NeedForGapsInfoNR and NeedForGapsInfoNR3.

If the first RRC message was RRCReconfiguration message, and if UE consider itself to be configured to provide MUSIM assistance information or configured to provide its preference on type6Gap, the second RRC message is UEAssistanceInformation message.

The RRCReconfigurationComplete message includes same transaction-identifier as the transaction-identifier included in RRCReconfiguration message.

The RRCResumeComplete message includes same transaction-identifier as the transaction-identifier included in RRCResume message.

UEAssistanceInformation message does not include transaction-identifier.

GNB receives the second message and determines gap configurations for the UE.

In 2A-19, GNB transmits UE third RRC message to indicate gap configuration.

The third message can be RRCReconfiguration message.

To configure Type1Gap or Type2Gap or Type3Gap or Type4Gap, GNB includes MeasConfig IE in the RRCReconfiguration message. The MeasConfig IE specifies measurements to be performed by the UE. The MeasConfig IE includes measGapConfig IE.

MeasGapConfig IE may include following fields: a gapFR2 field, a gapFR1 field, a gapUE field, a gapUEToAddModList field, a gapUEToReleaseList field, a gapFR1ToAddModList field, gapFR1ToReleaseList field, gapFR2ToReleaseList field and a gapFR2ToAddModList field GapFR2 and gapFR1 and gapUE are defined as SetupRelease. If gapFR2 (or gapFR1 or gapUE) is set to "setup", a gapConfig IE is included in the gapFR2 (or gapFR1 or gapUE) and a FR2-gap (or FR1-gap or UE-gap) is setup. If gapFR2 (or gapFR1 or gapUE) is set to "release", corresponding gapConfig is released.

GapUEToReleaseList and gapFR1ToReleaseList and gapFR2ToReleaseList consist of one or more one or more MeasGapId IEs. gapUEToAddModList and gapFR1ToAddModList and gapFR2ToAddModList consist of one or more GapConfig IEs. gapUE and gapFR1 and gapFR2 consist of a GapConfig IE.

GapUEToAddModList and gapUE configure one or more per-UE measurement gap. gapFR1ToAddModList and gapFR1 configure one or more per-FR1 measurement gap. gapFR2ToAddModList and gapFR2 configure one or more per-FR2 measurement gap.

During per-UE measurement gaps, UE does not conduct reception/transmission from/to the NR serving cells across FR1 and FR2 except the reception of signals used for RRM measurement(s), PRS measurement(s) and the signals used for random access procedure.

During per-FR1 measurement gaps, UE does not conduct reception/transmission from/to the FR1 NR serving cells except the reception of signals used for RRM measurement(s), PRS measurement(s) and the signals used for random access procedure.

During per-FR2 measurement gaps, UE does not conduct reception/transmission from/to the FR2 NR serving cells except the reception of signals used for RRM measurement(s), PRS measurement(s) and the signals used for random access procedure.

GapFR2 and gapFR1 and gapUE are used to configure a type1Gap. gapUEToAddModList and gapFR1ToAddModList and gapFR2ToAddModList are used to configure one or more type2Gap or type3Gap or type4Gap or combination of them.

GapFR2 is located in the non-extended part of the MeasGapConfig. gapFR1 and gapUE are located in the first extended part of the MeasGapConfig. gapUEToAddModList and gapFR1ToAddModList and gapFR2ToAddModList are located in the second extended part of the MeasGapConfig.

One or more one or moregapUEToAddModList one or moregapUEToAddModList gapUEToAddModList A gapConfig IE indicates the time pattern of the gap and the type of the gap. A gapConfig IE includes measGapId and gapOffset and mgl and mgrp and mgta and mgl2 and type2Indicator and type4Indicator and deactivateIndicator MGL2 is included in the second extended part of gapConfig IE. type2Indicator and type4Indicator and deactivateIndicator are included in the third extended part of gapConfig IE. The third extended part is placed after the second extended part in the gapConfig IE.

GapOffset indicates an integer between 0 and 159 (i.e., highest mgrp-1).

MGL is enumerated with six values: ms1dot5 and ms3 and ms3dot5 and ms4 and ms5dot5 and ms6. value ms1dot5 corresponds to 1.5 ms. value 3 ms corresponds to 3 ms and so on.

MGL2 is enumerated with two values: ms10 and ms20. mgl and mgl2 indicate the length of gap. If both mgl and mgl2 are included in a gapConfig, mgl2 is applied and mgl is ignored.

Mgrp is enumerated with four values: ms20, ms40, ms80 and ms160.

Mgta IE is enumerated with three values: ms0, ms0dot25 and ms0dot5. mgta IE indicates the measurement gap timing advance (or interruption timing advance in case of Type4Gap) in ms.

Type4Indicator is enumerated with a single value of "True". If this IE is present in the GapConfig, GapConfig is the configuration of type4Gap.

Type2Indicator is enumerated with a single value of "True". If this IE is present in the GapConfig, GapConfig is the configuration of type2Gap.

DeactivateIndicator is enumerated with a single value of "Deactivated". If this IE is present in the GapConfig, the gap is deactivated upon configuration. If this IE is absent in the GapConfig for type3Gap or for type4Gap, the gap is activated upon configuration. this IE is used only for type3Gap or type4Gap and not used for type2Gap.

If a GapConfig includes neither type4Indicator nor type2Indicator, GapConfig is the configuration of type3Gap.

A GapConfig does not include type2Indicator and deactivateIndicator at the same time. A GapConfig can include type4Indicator and deactivateIndicator at the same time.

MeasGapIdA measGapIdIE is an integer between 0 and 15. A measGapId identifies a measurement gap configuration of a type2Gap or a type3Gap or a type4Gap. Hence different measGapId is allocated across the types of measurement gaps and frequency regions of measurement gaps (i.e. a per-FR1 type3Gap and a per-FR2 type3Gap shall be allocated with different measGapId).

GapConfig IE included in gapFR2 field or in gapFR1 field or in gapUE field does not include measGapId IE. GapConfig IE included in gapUEToAddModList or gapFR1ToAddModList or gapFR2ToAddModListcan include measGapId field.

To configure Type5Gap, GNB includes musim-GapConfig IE in the RRCReconfiguration message. musim-GapConfig IE indicates the gap configuration of Type5Gap that applies to all frequencies. a musim-GapConfig IE includes a single musim-GapToReleaseList IE and a single musim-GapToAddModList IE. A musim-GapToReleaseList consists of one or more musim-GapId. A musim-GapToAddModList consists of one or more musim-GapToAddMod IEs.

A musim-GapToAddMod IE can include musim-gapId, musim-Starting-SFN-AndSubframe, musim-GapLength and musim-GapRepetitionAndOffset.

A musim-gapId IE is an integer between 0 and 1.

Musim-Starting-SFN-AndSubframe IE indicates the gap starting position for the aperiodic type5 gap. It includes starting SFN and starting subframe.

Musim-GapRepetitionAndOffset indicates the gap repetition period in ms and gap offset in number of subframes. It includes an integer chosen from a integer set. The highest value of the integer set is equal to the repetition period-1.

The integer indicates the starting offset of the gap. For example, a integer chosen from a integer set with highest value of 1279 indicates that the repetition period is 1280 ms. UE determines the offset based on the signaled integer and the repetition period based on the highest integer of the integer set.

If musim-gap is periodic gap, musim-GapLength and musim-GapRepetitionAndOffset are present.

If musim-gap is aperiodic gap, musim-Starting-SFN-AndSubframe is present.

To configure Type6Gap, GNB includes Type6GapConfig IE in the RRCReconfiguration message. Type6GapConfig IE indicates the gap configuration of Type6Gap that applies to a specific FR (i.e. FR2). Type6GapConfig IE includes a gapOffset field and a ugl field and a ugrp field.

UGL field indicates one of ms0dot125 and ms0dot25 and ms0dot5 and ms1. ms0dot125 corresponds to 0.125 ms, ms0dot25 corresponds to 0.25 ms and so on. ugl indicates a length of the type6 gap.

Ugrp field indicates the gap repetition period of the type6 gap. ugrp field indicates one of ms5 and ms20 and ms40 and ms160.

Type6GapRefServCellIndicator field indicates a serving cell identifier whose SFN and subframe is used for type6Gap calculation for gap pattern. If this field is absent, UE uses PCell for this purpose.

In 2A-21, UE setup the gap based on the gap information received in 2A-17.

If the third message includes measGapConfig IE, UE determines the gap to be setup according to the information included in the measGapConfig IE as shown in the table below.

TABLE 5

| Conditions for Type1Gap determination | when the conditions are fulfilled, UE setup following gap |
|---|---|
| If measGapConfig includes gapFR1 and if gapFR1 is set to setup and if the GapConfig does not include the third extended part | UE setup FR1 type1Gap |
| If measGapConfig includes gapFR1 and if gapFR1 is set to release and if the established gapFR1 is FR1 type1Gap | UE release FR1 type1Gap |
| If measGapConfig includes gapFR2 and if gapFR2 is set to setup and if the GapConfig does not include the third extended part | UE setup FR2 type1Gap |
| If measGapConfig includes gapFR2 and if gapFR2 is set to release and if the established gapFR2 is FR2 type1Gap | UE release FR2 type1Gap |
| If measGapConfig includes gapUE and if gapUE is set to setup and if the GapConfig does not include the third extended part | UE setup UE type1Gap |
| If measGapConfig includes gapUE and if gapFR2 is set to release and if the established gapUE is UE type1Gap | UE release UE type1Gap |

TABLE 6

| Conditions for Type2Gap determination | when the conditions are fulfilled |
|---|---|
| If measGapConfig includes a gapFR1ToAddModList and if type2Indicator is included (or set to TRUE) in at least one gapConfig in the list | UE setup Per-FR1 type2Gap for the corresponding measGapId |
| If measGapConfig includes gapFR1ToReleaseList and if at least one measGapId in the list is associated with Per-FR1 type2Gap | UE release Per-FR1 type2Gap corresponding to the measGapId |
| If measGapConfig includes a gapFR2ToAddModList and if type2Indicator is included (or set to TRUE) for at least one gapConfig in the list | UE setup Per-FR2 type2Gap for the corresponding measGapId |
| If measGapConfig includes gapFR2ToReleaseList and if at least one measGapId in the list is associated with Per-FR2 type2Gap | UE release Per-FR2 type2Gap corresponding to the measGapId |
| If measGapConfig includes a gapUEToAddModList and if type2Indicator is included (or set to TRUE) for at least one gapConfig in the list | UE setup UE type2Gap for the corresponding measGapId |
| If measGapConfig includes gapUEToReleaseList and if at least one measGapId in the list is associated with UE type2Gap | UE release UE type2Gap corresponding to the measGapId |

TABLE 7

| Conditions for Type3Gap determination | when the conditions are fulfilled |
|---|---|
| If measGapConfig includes a gapFR1ToAddModList and if neither type2Indicator nor type4Indicator are included in at least one gapConfig in the list | UE setup Per-FR1 type3Gap for the corresponding measGapId |

TABLE 7-continued

| Conditions for Type3Gap determination | when the conditions are fulfilled |
|---|---|
| If measGapConfig includes gapFR1ToReleaseList and if at least one measGapId in the list is associated with Per-FR1 type3Gap | UE release Per-FR1 type3Gap corresponding to the measGapId |
| If measGapConfig includes a gapFR2ToAddModList and if neither type2Indicator nor type4Indicator are included in at least one gapConfig in the list | UE setup Per-FR2 type3Gap for the corresponding measGapId |
| If measGapConfig includes gapFR2ToReleaseList and if at least one measGapId in the list is associated with Per-FR2 type3Gap | UE release Per-FR2 type3Gap corresponding to the measGapId |
| If measGapConfig includes a gapUEToAddModList and if neither type2Indicator nor type4Indicator are included in at least one gapConfig in the list | UE setup UE type3Gap for the corresponding measGapId |
| If measGapConfig includes gapUEToReleaseList and if at least one measGapId in the list is associated with UE type3 Gap | UE release UE type3Gap corresponding to the measGapId |

TABLE 8

| Conditions for Type4Gap determination | when the conditions are fulfilled |
|---|---|
| If measGapConfig includes a gapFR1ToAddModList and if type4Indicator is included in at least one gapConfig in the list | UE setup Per-FR1 type4Gap for the corresponding measGapId |
| If measGapConfig includes gapFR1ToReleaseList and if at least one measGapId in the list is associated with Per-FR1 type4Gap | UE release Per-FR1 type4Gap corresponding to the measGapId |
| If measGapConfig includes a gapFR2ToAddModList and if type4Indicator is included in at least one gapConfig in the list | UE setup Per-FR2 type4Gap for the corresponding measGapId |
| If measGapConfig includes gapFR2ToReleaseList and if at least one measGapId in the list is associated with Per-FR2 type4Gap | UE release Per-FR2 type4Gap corresponding to the measGapId |
| If measGapConfig includes a gapUEToAddModList and if type4Indicator is included in at least one gapConfig in the list | UE setup UE type4Gap for the corresponding measGapId |
| If measGapConfig includes gapUEToReleaseList and if at least one measGapId in the list is associated with UE type4Gap | UE release UE type4Gap corresponding to the measGapId |

TABLE 9

| Conditions for Type5Gap determination | when the conditions are fulfilled |
|---|---|
| If musim-GapConfig includes musim-GapToAddModList and if musim-GapLength and musim-GapRepetitionAndOffset are included in at least one musim-GapConfigToAddMod | UE setup periodic UE type5Gap for the corresponding musim-gapId. |
| If musim-GapConfig includes musim-GapToAddModList and if musim-Starting-SFN-AndSubframe is included in at least one musim-GapConfigToAddMod | UE setup aperiodic UE type5Gap for the corresponding musim-gapId. |
| If musim-GapConfig includes musim-GapToReleaseList and if at least one musim-gapId is included in the list | UE release UE type5Gap corresponding to musim-gapId. |

TABLE 10

| Conditions for Type6Gap determination | when the conditions are fulfilled |
|---|---|
| If type6GapConfig is included in RRCReconfiguration and if type6GapConfig is set to setup | UE setup type6Gap |
| If type6GapConfig is included in RRCReconfiguration and if type6GapConfig is set to release | UE release type6Gap |

FR1 type1Gap and FR2 type1Gap and UE type1Gap and UE type2Gap and FR1 type3Gap and FR2 type3Gap and UE type3Gap and FR1 type4Gap and FR2 type4Gap and UE type4Gap are established as below.

UE setup the gap configuration indicated by the measGapConfig in accordance with OFFSET, i.e., the first subframe of each gap occurs at an SFN and subframe meeting the following condition:
SFN mod T=FLOOR(OFFSET/10);
subframe=gapOffset mod 10;
with T=mgrp/10;
UE apply the specified timing advance mgta to the gap occurrences calculated above (i.e., the UE starts the measurement mgta ms before the gap subframe occurrences).

Periodic Type5Gap is established as below.
UE setup the gap configuration indicated by the musim-GapConfig in accordance with the received musim-GapRepetitionAndOffset-, i.e., the first subframe of each gap occurs at an SFN and subframe meeting the following condition:
SFN mod T=FLOOR(INTEGER1-/10);
subframe=gapOffset mod 10;
with T=MUSIM-PERIODICITY/10;
INTEGER1 is the integer indicated by musim-GapRepetitionAndOffset. MUSIM-PERIODICITY is equal to the highest value of the corresponding integer set plus one. The corresponding integer set is the one where INTEGER1 is chosen.

Aperiodic Type5Gap is established as below.
UE setup the gap configuration indicated by the musim-GapConfig in accordance with musim-Starting-SFN-And-Subframe, i.e., the first subframe of the aperiodic gap occurs at an SFN and subframe indicated in musim-Starting-SFN-AndSubframe.

Type6Gap is established as below.
UE setup the gap configuration indicated by the type6GapConfig in accordance with the received gapOffset, i.e., the first subframe of each gap occurs at an SFN and subframe meeting the following condition:
SFN mod T=FLOOR(gapOffset/10);
subframe=gapOffset mod 10 if ugrp is larger than 5 ms;
subframe=gapOffset or gapOffset+5 if ugrp is equal to 5 ms;
with T=CEIL(ugrp/10);
Each gap occurs (or begins) at the first static uplink slot determined from the first subframe (i.e., each gap occurs/begins at the first static uplink slot starting from the first slot of the first subframe).

As a consequence of above operations, UE setup multiple gap configurations. To achieve reasonable level of UE implementation complexity, the possible combinations of gaps are limited as below.

TABLE 11

| | Simultaneous configuration & use (activation) |
|---|---|
| Case 1 | n1 * FR1-Type1Gap + n2 * FR2-Type1Gap can be configured and used simultaneously<br>n1 and n2 are either 0 or 1. |

TABLE 11-continued

| | Simultaneous configuration & use (activation) |
|---|---|
| Case 2 | n3 * UE-Type1Gap can be configured and used<br>n3 is 1. |
| Case 3 | n1 * FR1-Type4Gap + n2 * FR2-Type4Gap can be configured and used simultaneously |
| Case 4 | n3 * UE-Type4Gap can be configured and used simultaneously |
| Case 5 | n4 * FR1-Type3Gap + n5 * FR2-Type3Gap + n6 * UE-Type3Gap can be configured and used simultaneously.<br>n4 and n5 and n6 are either 0 or 1 or 2.<br>All n4 and n5 and n6 being 0 is not valid |
| Case 6 | n7 * Type2Gap can be configured simultaneously<br>n7 is either 1 or 2 or 3<br>Only one Type4Gap among the configured Type4Gap is used |
| Case 7 | n8* Type5Gap can be configured and used simultaneously<br>n8 is 1 or 2 or 3 |

All the Type1Gap and Type3Gap and Type4Gap and Type5Gap are immediately used (i.e., used from the next occurrence) once the corresponding gap configurations are setup.

One or more Type2Gap configuration can be setup. However only subset of plurality of Type2Gap is used depending on the currently active downlink BWP.

Only one Type1Gap or only one Type4Gap can be configured and used as FR1-gap. one or two Type3Gap can be configured and used simultaneously as FR1-gap.

Only one Type1Gap or only one Type4Gap can be configured as FR2-gap. one or two Type3Gap can be configured and used simultaneously as FR2-gap.

Only one Type1Gap or only one Type4Gap can be configured and used simultaneously as UE-gap. One or more Type2Gap can be configured as UE-gap. One or more Type5Gap can be configured as UE-gap. Only one Type2Gap can be used as UE-gap. One or more Type5Gap can be used as UE-gap simultaneously.

A certain IE (or field) being enumerated with x and y means that the IE (or field) can indicate one of x and y.

In 2A-23, UE applies gap operations during a gap. UE performs normal operations during non-gap.

TABLE 12

| Gap type | Applied gap operation |
|---|---|
| Type1Gap | Gap Operation 1 during the gap |
| Type2Gap | Gap Operation 1-1 during the gap |
| Type3Gap | Gap Operation 1-1 during the gap |
| Type4Gap | Gap Operation 2 during interruption length<br>Gap operation 3 during measurement length |
| Type5Gap | Gap Operation 4 during the gap |
| Type6Gap | Gap Operation 6 during the gap |

A gap being active means the relevant gap operation being applied. A gap being inactive means the relevant gap operation not being applied and normal operation being applied as if gap is not configured.

Gap operation comprises data-activity-action-group and non-data-activity-action-group.

TABLE 13

| Gap operation type | data-activity-action-group | non-data-activity-action-group |
|---|---|---|
| Gap operation 1 | For serving-carrier-group, not performing the transmission of HARQ feedback, SR, and CSI | performing SSB based measurement on measurement-object-group. |

TABLE 13-continued

| Gap operation type | data-activity-action-group | non-data-activity-action-group |
|---|---|---|
| | in the uplink slots and in the uplink symbols of flexible slots during the gap. not reporting SRS in the uplink slots and in the uplink symbols of flexible slots during the gap. not transmitting on UL-SCH except for Msg3 or the MSGA payload in the uplink slots and in the uplink symbols of flexible slots during the gap. not monitoring the PDCCH in the downlink slots and in the downlink symbols of flexible slots during the gap except period X. not receiving on DL-SCH in the downlink slots and in the downlink symbols of flexible slots during the gap except period X. period X is when ra-ResponseWindow or the ra-ContentionResolutionTimer or the msgB-ResponseWindow is running | |
| Gap operation 1-1 | same data-activity-action-group as Gap operation 1 | performing SSB based measurement or CSI-RS based measurement or PRS based measurement on measurement-object-group. |
| Gap operation 2 | same data-activity-action-group as Gap operation 1 | RF retuning |
| Gap operation 3 | For serving-carrier-group, performing the transmission of HARQ feedback, SR, and CSI in the uplink slots and in the uplink symbols of flexible slots during the gap. reporting SRS in the uplink slots and in the uplink symbols of flexible slots during the gap. transmitting on UL-SCH in the uplink slots and in the uplink symbols of flexible slots during the gap monitoring the PDCCH in the downlink slots and in the downlink symbols of flexible slots during the gap. receiving on DL-SCH in the downlink slots and in the downlink symbols of flexible slots during the gap. | same non-data-activity-action-group as Gap operation 1-1 |
| Gap operation 4 | same data-activity-action-group as Gap operation 1 | performing paging reception or system information reception for the other USIM |
| Gap operation 6 | For serving-carrier-group (i.e. FR2 serving cells), not performing the transmission of HARQ | — |

TABLE 13-continued

| Gap operation type | data-activity-action-group | non-data-activity-action-group |
|---|---|---|
| | feedback and CSI during the gap. not reporting SRS during the gap. not transmitting on UL-SCH except for Msg3 or the MSGA payload and except for CG-PUSCH during the gap. performing transmission on PUCCH allocation for SR and on CG-PUSCH resource and PRACH resource | |

Type 1 gap and type 2 gap and type 3 gap and type 4 gap and type 5 gap consist with all types of slots (i.e. uplink slots and downlink slots and flexible slots indicated in tdd-UL-DL-ConfigurationCommon). A type 1 gap or a type 2 gap or a type 3 gap or a type 4 gap or a type 5 gap are consecutive in time within the respective gap (i.e. if the gap length is n ms, the distance between the starting point of the gap and the end point of gap is n ms) and consist with consecutive slots.

Type 6 gap consists with only static UL slots indicated in tdd-UL-DL-ConfigurationCommon. Type 6 gap could be non-consecutive in time (i.e. if the gap length is n ms, the distance between the starting point of the gap and the end point of gap could be longer than n ms) and consists with slots that could be non-consecutive with each other.

Time span of a gap is between the starting point of the gap and the end point of the gap.

During the time span of a type X gap (X is 1 or 2 or 3 or 4), UE is not required to (i.e. UE does not) conduct reception/transmission from/to the corresponding NR serving cells in the corresponding frequency range except the reception of signals used for RRM measurement(s) and the signals used for random access procedure.

During the time span of type 6 gap, UE is not required to (i.e. UE does not) conduct transmission to the corresponding NR serving cells in FR2 except for the signals used for random access procedure, CG-PUSCH (type 1 and 2) and PUCCH allocations for SR and LRR. During the time span of type 6 gap, UE conduct reception from the corresponding NR serving cell in FR2.

Serving-carrier-group and measurement-object-group are determined as in table.

TABLE 14

| Gap Type | serving-carrier-group | measurement-object-group |
|---|---|---|
| Type1Gap | If the gap is FR2 gap, serving-carrier-group is serving carriers (or serving cells) on FR2. If the gap is FR1 gap, serving-carrier-group is serving carriers (or serving cells) on FR1. If the gap is UE gap, serving-carrier-group is all serving carriers (or serving cells) or serving carriers (or serving cells) on FRI and FR2. | If the gap is FR2 gap, measurement-object-group is the measurement objects configured for FR2 frequencies. If the gap is FR1 gap, measurement-object-group is the measurement objects configured for FR1 frequencies. If the gap is UE gap, measurement-object-group is the measurement objects configured for FR1 frequencies and FR2 frequencies. |
| Type2Gap | Same as Type1Gap | Same as Type1Gap |
| Type3Gap | Same as Type1Gap | Regardless of whether the gap is FR1 gap or FR2 gap or UE gap, measurement-object-group is determined based on the associated measurement objects. If the gap is FR2 gap, only the measurement objects on FR2 can be associated with the gap. If the gap is FRI gap, only the measurement objects on FRI can be associated with the gap. |
| Type4Gap | Same as Type1Gap | Same as Type1Gap |
| Type5Gap | Type5Gap is UE gap. serving-carrier-group is all serving carriers (or serving cells) or serving carriers (or serving cells) on FR1 and FR2. | Type5Gap is UE gap. measurement-object-group is the measurement objects configured for FR1 frequencies and FR2 frequencies. |
| Type6Gap | Type6Gap is FR2 gap | N/A (UE is not required to perform measurement) |

In 2A-25, GNB performs transmission and reception with the UE considering the configured gap.

Type2Gap is described in more detail below.

A Type2Gap is associated with a DL BWP according to deactivatedMeasGapList for the DL BWP. A BWP-DownlinkDedicated IE can include a deactivatedMeasGapList1 IE.

The deactivatedMeasGapList1 indicates a list of measGapIds where the corresponding Type2Gaps (i.e. the gaps configured with type2Indicator) are deactivated upon the switch to this BWP.

A SCellConfig IE can include a deactivatedMeasGapList2 IE.

deactivatedMeasGapList2 indicates a list of measGapIds where the corresponding Type2Gaps (i.e. the gaps configured with type2Indicator) are deactivated while this SCell is activated.

Alternatively, deactivatedMeasGapList2 indicates a list of measGapIds where the corresponding Type2Gaps (i.e. the gaps configured with type2Indicator) are activated while this SCell is deactivated.

One or more Type2gaps can be configured for a UE. Among the gaps, UE activates a specific gap. The specific gap is the gap determined from the deactivatedMeasGapList1 of the active DL BWP or the gap determined from the deactivatedMeasGapList2 of the active SCell. For the active DL BWP, UE deactivates the type2Gaps listed in the deactivatedMeasGapList1 and activates the type2Gap not listed in the deactivatedMeasGapList1. For an active SCell, UE deactivates the type2Gaps listed in the deactivatedMeasGapList2 and activates the type2Gap not listed in the deactivatedMeasGapList2.

Type2Gap switching occurs when BWP switching occurs. More specifically, BWP switching occurs in the following cases.

Upon configuring Type2Gaps and DL BWPs based on a received RRCReconfiguration message, UE activates a Type2Gap determined from the deactivatedMeasGapList1 of a DL BWP to be activated after RRC reconfiguration. If firstActiveDownlinkBWP is present in the RRCReconfiguration message, the DL BWP to be activated is the DL BWP indicated by firstActiveDownlinkBWP-Id in the RRCReconfiguration message. If firstActiveDownlinkBWP-Id is absent in the RRCReconfiguration message, the DL BWP to be activated in the DL BWP that was active before RRCReconfiguration message is received.

After activating a Type2Gap, UE may need to do gap switching (i.e., UE may need to deactivate the current active Type2Gap and to activate a new Type2Gap). For example, if UE receives uplink grant on PDCCH (DCI format 0_1 or 0_2) including a bandwidthpart indicator field indicating an UL BWP different from the current active UL BWP, UE determines that gap switching is needed if condition 1 and condition 2 are fulfilled.

Condition 1: If the SpCell of the UE is in unpaired spectrum (i.e., TDD spectrum); and Condition 2: If the active Type2Gap associated with the old DL BWP (DL BWP that is active before reception of the UL grant on PDCCH) is different from the Type2Gap to be activated upon switch to the DL BWP having the same BWP id as the UL BWP indicated by the bandwidthpart indicator of the UL grant.

If both conditions are fulfilled, UE deactivates the current Type2Gap and activates the Type2Gap associated with the DL BWP having the same BWP id as the UL BWP indicated by the bandwidthpart indicator of the UL grant. If no Type2Gap is associated with the DL BWP, no Type2Gap is activated.

If UE receives DL assignment on PDCCH (DCI format 1_1 or 1_2), UE determines gap switching is needed if condition 3 is fulfilled.

Condition 3: If the active Type2Gap associated with the old DL BWP is different from the Type2Gap to be activated upon switch to the DL BWP indicated by the bandwidthpart indicator of the DL assignment If condition 3 is fulfilled, UE deactivates the current Type2Gap and activates the Type2Gap determined from the deactivatedMeasGapList1 of the DL BWP indicated by the bandwidthpart indicator of the DL assignment. If deactivatedMeasGapList1 is not configured to the DL BWP, all the configured Type2Gaps are activated.

If the bwp-InactivityTimer associated with the active DL BWP expires, UE determines gap switching is needed if condition 4 is fulfilled.

Condition 4: If the active Type2Gap associated with the active DL BWP (old DL BWP) is different from the Type2Gap to be activated upon switch to the DL BWP to be activated If defaultDownlinkBWP-Id is configured, The DL BWP to be activated is the DL BWP indicated by the defaultDownlinkBWP-Id.

If defaultDownlinkBWP-Id is not configured, The DL BWP to be activated is the DL BWP indicated by the initialDownlinkBWP.

If condition 4 is fulfilled, UE deactivates the current Type2Gap and activates the Type2Gap determined from the deactivatedMeasGapList1 of the DL BWP to be activated.

If Random Access procedure is initiated on a serving cell, UE determines gap switching is needed if condition 5 and condition 6 are fulfilled.

Condition 5: If PRACH occasions are not configured for the active UL BWP and if the serving cell is SpCell Condition 6: If the active Type2Gap associated with the active DL BWP (old DL BWP) is different from the Type2Gap to be activated upon switch to the DL BWP indicated by initialDownlinkBWP.

If condition 5 and 6 are fulfilled, UE deactivates the current Type2Gap and activates the Type2Gap associated with the DL BWP indicated by initialDownlinkBWP. If no Type2Gap is associated with the initial DL BWP, no Type2Gap is activated.

Alternatively, a BWP-DownlinkDedicated IE and a SCellConfig IE can include a deactivatedMeasGapBitmap IE respectively.

Each bit of the deactivatedMeasGapBitmap indicates the Type2GapStatus of each type2gap.

One UE-Type2gap or one FR1-Type2gap or one FR2-Type2gap or one FR1-Type2gap and one FR2-Type2gap can be configured for the UE.

If Type2GapStatus of the active DL BWP of the PCell is set to a first value (e.g., deactivated), UE deactivates the Type2Gap for the PCell.

If Type2GapStatus of the active DL BWP of the PCell is set to a second value (e.g., activated), UE activates the Type2Gap for the PCell.

The other way is also possible.

If Type2GapStatus of the active DL BWP of the PCell is set to a first value (e.g., activated), UE activates the Type2Gap for the PCell.

If Type2GapStatus of the active DL BWP of the PCell is set to a second value (e.g., deactivated), UE deactivates the Type2Gap for the PCell.

The initial DL BWP is the BWP of which BWP-id is 0. The initial DL BWP is the BWP of which BWP-id is implicitly configured. The initial BWP is the BWP of which BWP-id is not associated with an explicit BWP-Id IE. The initial DL BWP is the BWP of which cell specific configuration is provided in SIB1 and UE specific configuration is provided in RRCReconfiguration message. DL BWPs other than the initial BWP are the BWP of which cell specific configuration and UE specific configuration are provided in RRCReconfiguration message.

Type2Gap switching occurs when SCell activation/deactivation occurs.

Upon configuring Type2Gaps and a SCell based on a received RRCReconfiguration message, UE activates a Type2Gap determined from the deactivatedMeasGapList2 of the SCell.

Upon reception of a first MAC CE activating or deactivating the SCell, UE activates a Type2Gap determined from the deactivatedMeasGapList2 of the SCell.

Upon expiry of sCellDeactivationTimer configured for the SCell, UE activates a Type2Gap determined from the deactivatedMeasGapList2 of the SCell.

Alternatively, upon configuring Type2Gaps and a SCell based on a received RRCReconfiguration message, UE deactivates one or two Type2Gap determined from the deactivatedMeasGapList2 of the SCell.

Upon reception of a MAC CE activating or deactivating the SCell, UE deactivates one or two Type2Gap determined from the deactivatedMeasGapList2 of the SCell.

Upon expiry of sCellDeactivationTimer configured for the SCell, UE deactivates one or two Type2Gap determined from the deactivatedMeasGapList2 of the SCell.

Type2Gap switching occurs when a second MAC CE activating a Type2Gap is received.

Upon receiving the second MAC CE, UE activates the type2Gap indicated in the second MAC CE.

When BWP switch occurs, which results in status change of Type2Gap (i.e. Type2Gap activation or deactivation or both), UE finishes type2Gap activation or deactivation within 5+x ms since BWP switch occur (i.e. since DCI reception or timer expiry). x is determined based at least part on bwp-SwitchingDelay and SCS of the BWPs as in table below.

TABLE 15

| shorter SCS between old BWP and the new BWP | slot length | Type 1 | Type 2 |
|---|---|---|---|
| 15 kHz | 1 ms | 1 ms | 3 ms |
| 30 kHz | 0.5 ms | 1 ms | 2.5 ms |
| 60 kHz | 0.25 ms | 0.75 ms | 2.25 ms |
| 120 kHz | 0.125 ms | 0.75 ms | 2.25 ms |

BWP-SwitchingDelay defines whether the UE supports DCI and timer based active BWP switching delay type1 or type2. It indicates one of type1 and type2.

When SCell is deactivated due to the first MAC CE reception, UE finishes type2Gap activation or deactivation within 5+y ms since the first MAC CE deactivating the SCell is received. y is determined based at least part on the timing when acknowledgement for the first MAC CE is transmitted. y is equal to 3+y1 ms, where y1 is the timing between the first MAC CE transmission and the corresponding acknowledgement.

When SCell is deactivated due to due to the expiry of sCellDeactivationTimer, UE finishes type2Gap activation or deactivation within 5+y2 ms since the expiry of sCellDeactivationTimer. y2 is fixed to 3.

When SCell is activated or deactivated due to reception of RRCReconfiguration message, UE finishes type2Gap activation or deactivation within 5+z ms since the RRCReconfiguration message is received. z is 10 ms if RRCReconfiguration includes the configuration on PCell and does not includes the configuration on SCell addition/release. z is 16 ms if RRCReconfiguration includes the configuration on SCell addition/release.

The first MAC CE is SCell Activation/Deactivation MAC CE. The second MAC CE is Type2Gap L2 response MAC CE.

Type6Gap is described in more detail below.

The length of the type6Gap in terms of the number of slots is determined based on ugl field and type6GapRefServCellIndicator field. UE first determines the number of uplink slots from the gap length indicated by the ugl field and the SCS of the serving cell indicated by type6GapRefServCellIndicator. For example, if the gap length is 0.5 ms and UL SCS of the reference serving cell is 60 KHz, the number of slots for a type6Gap is 2 (=gap length/slot length of the reference serving cell). If type6GapRefServCellIndicator field is absent in type6GapConfig, UE determines the number of uplink slots based on ugl field and the SCS of the active UL BWP of the PCell.

Type6Gap starts in the nearest uplink slot from the reference subframe (or the first subframe). Type6Gap continues for consecutive n uplink slots. Depending on tdd-UL-DL-ConfigurationCommon, DL slots and flexible slots can exists between uplink slots (or within time span of uplink slots). Hence the actual length of type6Gap is determined by the number of uplink slots derived from type6GapLength field and the number of downlink slots that exist within the time span of the uplink slots and the number of flexible slots that exist within the time span of the uplink slots. UE performs normal downlink operation in the downlink slots and flexible slots within the Type6Gap. UE performs normal uplink operation in the flexible slots within the Type6Gap. UE stops any uplink operation in the uplink slots within the Type6Gap. UE does not perform uplink transmission of FR1 serving cells in the uplink slots during FR1 type6Gap. UE does not perform uplink transmission of FR2 serving cells in the uplink slots during FR2 type6Gap. UE does not perform uplink transmission of all serving cells in the uplink slots during UE type6Gap.

If Type2Gap needs to be updated or to be activated with regards to location measurement, UE moves to step 2A-27.

In 2A-27, UE transmits and GNB receives a type2Gap activation request message. The message could be either type2Gap L3 request message (type2Gap activation request RRC message) or type2Gap L2 request message (type2Gap activation request MAC CE).

If location measurements towards NR is started and if one or more Type2gaps are configured and if at least one of the type2Gaps meets the measurement gap requirements, UE trigger type2Gap L2 request procedure to initiate the transmission of the type2Gap related L2 request.

If location measurements towards NR is started and if one or more Type2gaps are configured and if none of the type2Gaps meets the measurement gap requirements, UE triggers type2Gap L3 request procedure to initiate transmission of the type2Gap L3 request message that includes a measurementIndication field set to nr-PRS-Measurement.

If location measurements towards NR is stopped, UE triggers type2Gap L3 request procedure to initiate transmission of the type2Gap L3 request message that includes a measurementIndication field set to release.

If at least one type2Gap L2 request is triggered, UE cancel the already triggered type2Gap L2 request message, if any, and triggers new type2Gap L2 request message.

If Type2Gap L2 request message has been triggered, and not cancelled and if UL-SCH resources are available for a new transmission and these UL-SCH resources can accommodate the Type2Gap L2 request message plus its subheader as a result of logical channel prioritization, UE cancel triggered Type2Gap L2 request message and generates the Type2Gap L2 request message and.

If Type2Gap L2 request message has been triggered, and not cancelled and if UL-SCH resources are not available for a new transmission UE triggers a Scheduling Request for Type2Gap L2 request message without triggering BSR.

A Type2Gap L2 request message is identified by MAC subheader with one-octet eLCID and has a fixed size of one octet. A Type2Gap L2 request message consists of a bitmap or of n R bits and a measGapId field. The measGapId field indicates the type2Gap that UE requests for activation. The size of the measGapId field is 8-n bits (or n is 8—the size of measGapId field). Each bit of the bitmap corresponds to a type2Gap configured for the UE. The first bit corresponds to the type2Gap with the lowest measGapId, the second bit corresponds to the type2Gap with the second lowest measGapId and so on.

The subheader of a Type2Gap L2 request message is consists of two R bits and a 6 bit LCID field and a 8 bit eLCID field. The LCID field is set to a first value indicating a 8 bit extended logical channel ID field follows. The first value is 34. If LCID field is set to a second value, a 16 bit extended logical channel ID field follows. UE sets the LCID field to the first value for Type2Gap L2 request message. 8 bit eLCID field is set to a third value indicating that the type of corresponding MAC CE is type2Gap L2 request message. The third value in eLCID field corresponds to the LCID value calculated from the third value plus a constant. It is to avoid the ambiguity between LCID value indicated by LCID field and LCID value indicated by eLCID field. The constant is the maximum value of LCID field plus one (i.e.64). For example, if the third value in eLCID field is 249, it indicates the type of the MAC CE corresponds to LCID value of 313 (=249+64).

Type2Gap L3 request message includes a measurementIndication field that can be set to release or set to setup. If it is set to setup, the field includes a LocationMeasurementInfo IE. The LocationMeasurementInfo IE includes a dl-PRS-PointA field and RepetitionAndOffset field and a PRS-length field.

DL-PRS-PointA field indicates the absolute radio frequency channel number of the carrier for which UE needs to perform PRS measurement.

RepetitionAndOffset field indicates the gap periodicity in ms and offset in number of subframes of the requested gap.

PRS-length field indicates the gap length of the requested gap.

UE shall set the contents of Type2Gap L3 request message according to the required gap and trigger BSR to request resource for Type2Gap L3 request message. The triggered BSR can trigger SR.

The priority of type2Gap L2 request message is higher than the priority of type2Gap L3 request message.

The subheader of a Type2Gap L3 request message is consists of one R bit and one F field and a LCID field and a L field. The LDID field is set to 1 to indicate that the MAC SDU is SRB1 data.

In 2A-29, GNB transmits and UE receives a type2Gap activation response message. The message could be either type2Gap L3 response message (type2Gap activation response RRC message) or type2Gap L2 response message (type2Gap activation response MAC CE). If UE transmitted type2Gap L2 request message, GNB respond with type2Gap L2 response message. If UE transmitted type2Gap L3 request message, GNB respond with type2Gap L3 response message.

A Type2Gap L2 response message is identified by MAC subheader with one-octet eLCID and has a variable size. A Type2Gap L2 response message include one or more response information. A response information includes a A/D field (n−1) R bits and a measGapId field.

A/D field indicates whether to activate or deactivate the type2Gap indicated by the measGapId following the A/D field. The field is set to 1 to indicate activation, otherwise it indicates deactivation.

The subheader of a Type2Gap L2 response message is consists of one R bit and one F field and a LCID field and a 8 bit eLCID field and a L field. The LCID field is set to a first value indicating a 8 bit extended logical channel ID field follows. The first value is 34. 8 bit eLCID field is set to a fourth value indicating that the type of corresponding MAC CE is type2Gap L2 response message. The fourth value in eLCID field corresponds to the LCID value calculated from the fourth value plus a constant.

L field indicates the size of Type2Gap L2 response message. The size is determined by the number of response information included in the message.

Upon the reception of the Type2Gap L2 response message, if the message indicates deactivation of a type2Gap UE deactivates the type2Gap and if the message indicates activation of a type2Gap UE activates the type2Gap.

Since measGapId is consistently allocated across type2Gap and type3Gap and type4Gap, type2Gap L2 response message can activate type3Gap or type4Gap as well. To activate or deactivate a plurality of type3Gaps associated with a specific carrier frequency (or a specific measurement object), GNB includes in type2Gap L2 response message the plurality of measGapId(s). Each of plurality of measGapId(s) is associated with a type3Gap and one or more measGapIds are associated with the same measurement object.

Type2Gap L3 response message includes a measGapConfig. The measGapConfig may include a gapConfig IE corresponding to the requested type2Gap. The gapConfig IE may include a one bit indication that the type2Gap is activated.

In 2A-31, UE and GNB performs RRC_CONNECTED operation (e.g. data transmission/reception) according to the configured and activated gap.

During the RRC_CONNECTED operation, UE may detect some events and initiates RRC re-establishment procedure. The event includes detecting radio link failure, re-configuration with sync failure, integrity check failure and RRC connection reconfiguration failure.

Upon such failures, UE needs to re-establish the RRC connection in the new cell. To perform this task quickly, UE stops all other tasks like gap request or preference indication. Also, since gap operation restricts the UE activity, UE stops gap operation as well.

In 2A-33, UE performs RRC re-establishment procedure.

Upon initiation of RRC re-establishment procedure and before transmission RRCReestablishmentRequest in the selected suitable cell, UE releases configuration information for gap request such as needForGapsConfigNR, needForGapsConfigNR2, needForGapsConfigNR3, musim-AssistanceConfig and needFortype6Gap. UE also cancels any triggered type2Gap L2 request procedure and discard any type2Gap L2 request message.

UE performs cell selection to find a new suitable cell.

Upon selecting a suitable cell, UE applies default MAC Cell Group configuration and CCCH configuration and initiates transmission of RRCReestablishmentRequest message.

The RRCReestablishmentRequest message includes a ue-Identity field and a shortMAC-I field and a reestablishmentCause field.

UE re-establish PDCP and RLC of SRB1 and transmits RRCReestablishmentRequest via SRB0.

GNB receives the RRCReestablishmentRequest message and determines whether to reestablish the RRC connection based on the ue-Identity field and the shortMAC-I field and the reestablishmentCause field.

If GNB determines to reestablish RRC connection with the UE, GNB transmits RRCReestablishment message via SRB1.

UE receives the RRCReestablishment message via SRB1 and release the type x (x is 1 or 2 or 3 or 4) gap configurations indicated by measGapConfig and the type 5 gap configuration indicated by musim-GapConfig and type 6 gap configuration indicated by type6GapConfig.

UE transmits to GNB RRCReestablishmentComplete message to confirm that UE completes the procedure.

In short, UE releases gap request configuration at first point of time and UE release gap configuration at second point of time. UE can stop gap operation before releasing the configuration to facilitate quicker reestablishment. For example, UE can stop gap operation at first point of time or at third point of time.

The first point of time is after initiating RRC re-establishment procedure and before selecting a suitable cell (or before transmitting RRCReestablishmentRequest message via SRB0).

The second point of time is after receiving RRCReestablishment message via SRB1 and before transmitting RRCReestablishmentComplete message via SRB1.

The third point of time is after transmitting RRCReestablishmentRequest message via SRB0 and before receiving RRCReestablishment message via SRB1.

Figure 3:
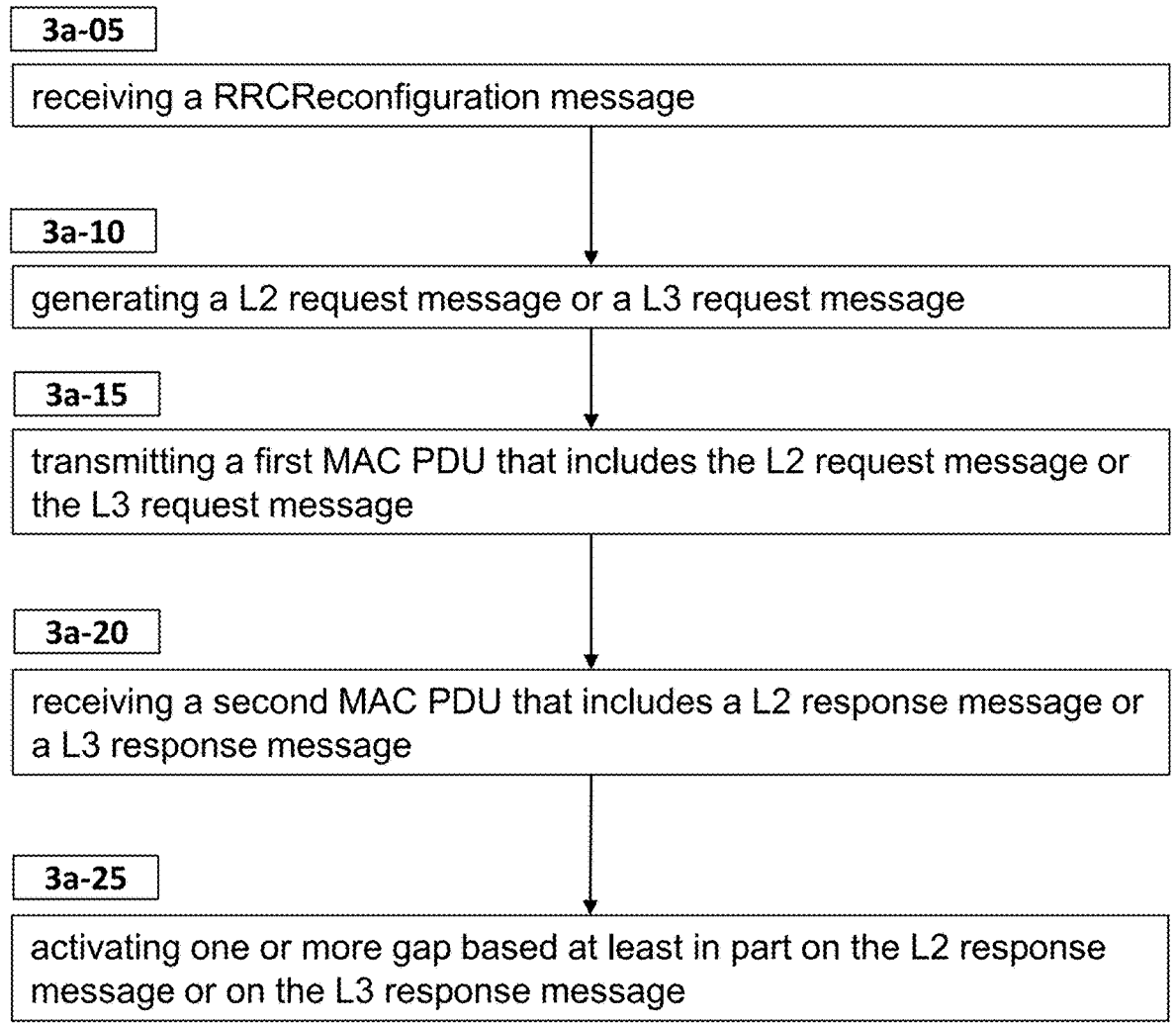
FIG. 3 is a flow diagram illustrating an operation of a terminal.

FIG. 3 is a flow diagram illustrating an operation of a terminal.

In 3A-05, terminal receives a RRCReconfiguration message, the RRCReconfiguration message includes one or more gap configuration information, each of one or more gap configuration information includes a measGapId and a type2Indicator and a gapOffset and a mgl and a mgrp.

In 3A-10, terminal generates a L2 request message or a L3 request message.

In 3A-15, terminal transmits a first MAC PDU that includes the L2 request message or the L3 request message.

In 3A-20, terminal receives a second MAC PDU that includes a L2 response message or a L3 response message.

In 3A-25, terminal activates one or more gap based at least in part on the L2 response message or on the L3 response message.

The L2 request message includes a measGapId of a gap configuration information and the L3 request message includes information for gap length and gap repetition period and gap offset.

The L2 request message is generated If location measurements towards NR is started and if one or more Type2gaps are configured and if at least one of the type2Gaps meets the measurement gap requirements.

The L3 request message is generated If location measurements towards NR is started and if one or more Type2gaps are configured and if none of the type2Gaps meets the measurement gap requirements.

The L2 response message includes one or more measGapId of one or more a gap configuration information and the L3 request message includes one or more gap configuration information.

The L2 response message is received in response to the L2 request message.

The L3 response message is received in response to the L3 request message.

A subheader for the L2 request message in the first MAC PDU consists of two reserved bits and a LCID field and eLCID field.

A subheader for the L2 response message in the second MAC PDU consists of a reserved bit and a F field and a LCID field and eLCID field and a L field.

A subheader for the L3 request message in the first MAC PDU and a subheader for the L3 response message in the second MAC PDU consists of a reserved bit and a F field and a LCID field and a L field.

Figure 4A:
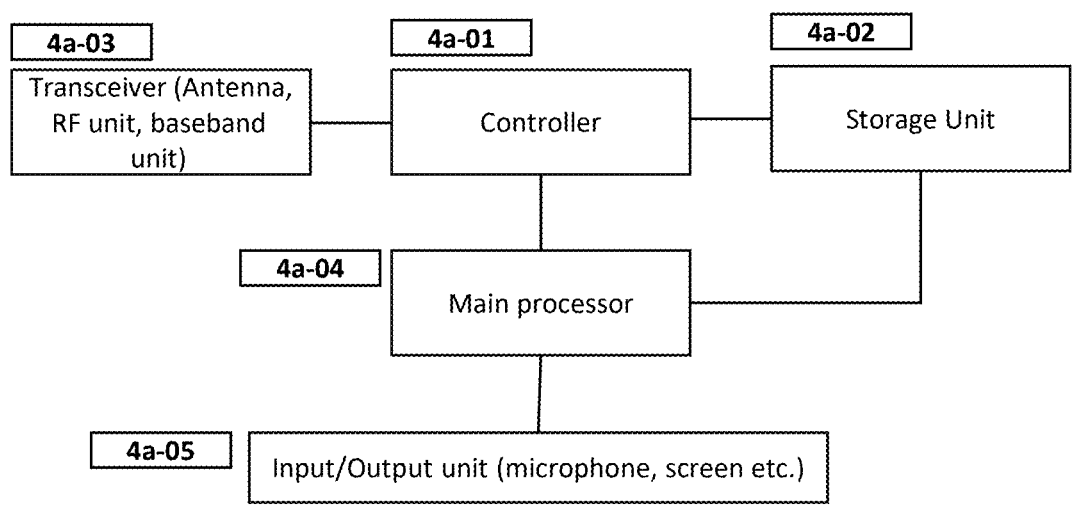
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2 and FIG. 3 are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down—converts an RF band signal received through the antenna into a baseband signal. The RF processor may include a transmission filter, a reception filter, an amplifier, a mi10r, an oscillator, a digital—to—analog converter (DAC), an analog—to—digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
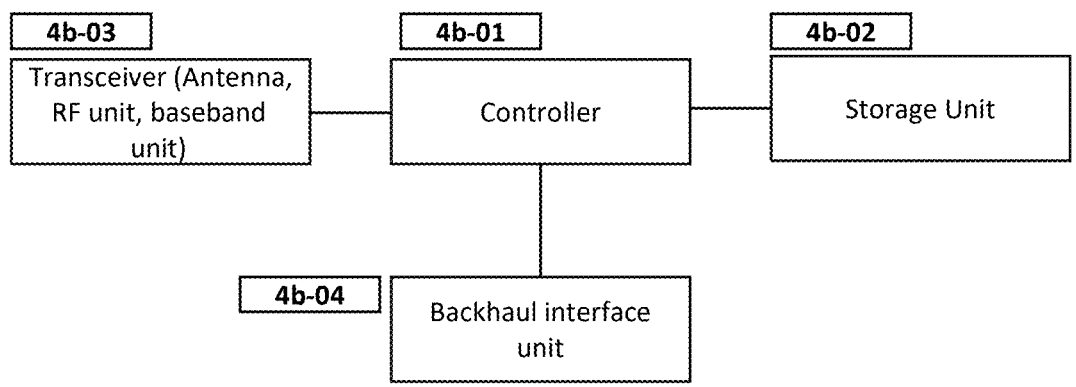
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2 are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi—connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down—converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

What is claimed is:

1. A method by a terminal, the method comprising:
   receiving, by the terminal from a base station, a RRCReconfiguration, wherein the RRCReconfiguration includes a one or more gap configuration information, wherein each of the one or more gap configuration information includes a gap identifier Information Element (IE) and a gap offset IE and a gap length IE and a gap repetition period IE;
   configuring, by the terminal, a one or more preconfigured gaps based on the one or more gap configuration information;
   deactivating, by the terminal, the one or more preconfigured gaps;
   triggering, by the terminal, a gap request message in case that:
     location measurement towards new radio is started; and
     at least one of the one or more preconfigured gaps meets requirement;
   triggering, by the terminal, a Scheduling Request (SR) for the gap request message in case that:
     a Uplink Shared Channel (UL-SCH) resource is available; and
     the UL-SCH resource does not accommodate the gap request message and a Medium Access Control (MAC) subheader;
   transmitting, by the terminal to the base station, a first MAC Protocol Data Unit (PDU), wherein the first MAC PDU includes the gap request message;
   receiving, by the terminal from the base station, a second MAC PDU, wherein the second MAC PDU includes a gap response message; and
   activating, by the terminal, a preconfigured gap of the one or more preconfigured gaps based on a second information in the gap response message,
   wherein:
     the gap request message includes a first information;
     the first information is to request activation of a preconfigured gap of the one or more preconfigured gaps; and
     the first information includes a gap identifier of the preconfigured gap, and
   wherein
     the gap response message includes the second information;
     the second information indicates activation of the preconfigured gap of the one or more preconfigured gaps; and
     the second information includes the gap identifier of the preconfigured gap and a field indicating activation or deactivation of the preconfigured gap.

2. The method of claim 1, wherein:
   the MAC subheader of the gap request message includes a first Logical Channel Identifier (LCID) field and a second LCID field;
   the first LCID field includes a first value;
   the second LCID field includes a second value; and
   LCID of the gap request message is equal to sum of the second value and a constant.

3. The method of claim 1, wherein:
   the MAC subheader of the gap response message includes the first LCID field and the second LCID field;

the first LCID field includes a first value;
a second LCID field includes a third value; and
LCID of the gap response message is sum of the third value and the constant.

4. A terminal in a wireless communication system, the terminal comprising:
a transceiver configured to transmit and receive a signal; and
a controller configured to control the transceiver to:
receive from a base station a RRCReconfiguration, wherein the RRCReconfiguration includes a one or more gap configuration information, wherein each of the one or more gap configuration information includes a gap identifier Information Element (IE) and a gap offset IE and a gap length IE and a gap repetition period IE;
configure a one or more preconfigured gaps based on the one or more gap configuration information;
deactivate the one or more preconfigured gaps;
trigger a gap request message in case that:
location measurement towards new radio is started; and
at least one of the one or more preconfigured gaps meets requirement;
trigger a Scheduling Request (SR) for the gap request message in case that:
a Uplink Shared Channel (UL-SCH) resource is available; and
the UL-SCH resource does not accommodate the gap request message and a Medium Access Control (MAC) subheader;
transmit to the base station a first MAC Protocol Data Unit (PDU), wherein the first MAC PDU includes the gap request message;
receive from the base station a second MAC PDU, wherein the second MAC PDU includes a gap response message; and
activate a gap of the one or more gaps based on a second information in the gap response message,
wherein:
the gap request message includes a first information;
the first information is to request activation of a preconfigured gap of the one or more preconfigured gaps; and
the first information includes a gap identifier of the preconfigured gap, and
wherein:
the gap response message includes the second information;
the second information indicates activation of the preconfigured gap of the one or more preconfigured gaps; and
the second information includes the gap identifier of the preconfigured gap and a field indicating activation or deactivation of the preconfigured gap.

5. A method by a base station, the method comprising:
transmitting, by the base station to a terminal, a RRCReconfiguration, wherein the RRCReconfiguration includes a one or more gap configuration information, wherein each of the one or more gap configuration information includes a gap identifier Information Element (IE) and a gap offset IE and a gap length IE and a gap repetition period IE;
configuring, by the base station, a one or more preconfigured gaps based on the one or more gap configuration information;
deactivating, by the base station, the one or more preconfigured gaps;
receiving, by the base station, a Scheduling Request (SR) for a gap request message;
receiving, by the base station from the terminal, a first Medium Access Control (MAC) Protocol Data Unit (PDU), the first MAC PDU includes the gap request message;
transmitting, by the base station to the terminal, a second MAC PDU, the second MAC PDU includes a gap response message; and
activating, by the base station, a preconfigured gap of the one or more preconfigured gaps based on a second information in the gap response message,
wherein:
the gap request message includes a first information;
the first information is to request activation of a preconfigured gap of the one or more preconfigured gaps; and
the first information includes a gap identifier of the preconfigured gap, and
wherein:
the gap response message includes the second information;
the second information indicates activation of the preconfigured gap of the one or more preconfigured gaps; and
the second information includes the gap identifier of the preconfigured gap and a field indicating activation or deactivation of the preconfigured gap.

* * * * *